United States Patent
Onyon et al.

(10) Patent No.: US 7,505,762 B2
(45) Date of Patent: Mar. 17, 2009

(54) WIRELESS TELEPHONE DATA BACKUP SYSTEM

(75) Inventors: Richard M. Onyon, San Jose, CA (US); Liam J. Stannard, San Jose, CA (US); Robert E. Garner, Lawrenceville, GA (US); Leighton A. Ridgard, San Jose, CA (US)

(73) Assignee: Fusionone, Inc., San Jose, CA (US)

( * ) Notice: Subject to any disclaimer, the term of this patent is extended or adjusted under 35 U.S.C. 154(b) by 558 days.

(21) Appl. No.: 10/789,816

(22) Filed: Feb. 27, 2004

(65) Prior Publication Data

US 2005/0191998 A1    Sep. 1, 2005

(51) Int. Cl.
*H04M 3/00*    (2006.01)

(52) U.S. Cl. .................. 455/419; 455/418; 455/420; 455/466; 455/502; 707/204; 709/206; 709/248; 711/100

(58) Field of Classification Search .......... 455/412.1–2, 455/414.1–3, 418–420, 466, 558, 550.1, 455/566, 502; 379/93.17; 709/206; 704/260; 707/204, 201; 711/162, 100; 714/15; 345/169, 345/173

See application file for complete search history.

(56) References Cited

U.S. PATENT DOCUMENTS

| | | | |
|---|---|---|---|
| 5,933,653 A | 8/1999 | Ofek | 395/826 |
| 5,974,238 A * | 10/1999 | Chase, Jr. | 709/248 |
| 6,000,000 A * | 12/1999 | Hawkins et al. | 707/201 |
| 6,014,695 A | 1/2000 | Yamashita et al. | 709/219 |
| 6,026,414 A | 2/2000 | Anglin | 707/204 |
| 6,038,665 A * | 3/2000 | Bolt et al. | 713/176 |
| 6,049,776 A | 4/2000 | Donnelly et al. | 705/8 |
| 6,064,880 A * | 5/2000 | Alanara | 455/419 |
| 6,173,311 B1 | 1/2001 | Hassett et al. | 709/202 |
| 6,195,695 B1 | 2/2001 | Cheston et al. | 709/221 |
| 6,219,694 B1 * | 4/2001 | Lazaridis et al. | 709/206 |
| 6,256,750 B1 | 7/2001 | Takeda | 714/11 |
| 6,260,124 B1 * | 7/2001 | Crockett et al. | 711/162 |
| 6,282,435 B1 * | 8/2001 | Wagner et al. | 455/566 |
| 6,285,889 B1 * | 9/2001 | Nykanen et al. | 455/557 |
| 6,292,905 B1 | 9/2001 | Wallach et al. | 714/4 |
| 6,317,755 B1 * | 11/2001 | Rakers et al. | 707/204 |
| 6,360,330 B1 | 3/2002 | Mutalik et al. | 714/4 |
| 6,363,249 B1 * | 3/2002 | Nordeman et al. | 455/418 |
| 6,381,700 B1 | 4/2002 | Yoshida | 713/201 |
| 6,396,482 B1 * | 5/2002 | Griffin et al. | 345/169 |
| 6,418,309 B1 * | 7/2002 | Moon et al. | 455/418 |
| 6,453,392 B1 | 9/2002 | Flynn, Jr. | 711/151 |
| 6,539,494 B1 | 3/2003 | Abramson et al. | 714/4 |
| 6,591,362 B1 | 7/2003 | Li | 713/1 |
| 6,704,849 B2 | 3/2004 | Steegmans | 711/162 |
| 6,728,530 B1 * | 4/2004 | Heinonen et al. | 455/414.1 |

(Continued)

OTHER PUBLICATIONS

Finnigan, Anne, "The Safe Way to Shop Online," Sep. 1998, p. 162, Good Housekeeping, v. 227 No. 3.

(Continued)

*Primary Examiner*—Sharad Rampuria
(74) *Attorney, Agent, or Firm*—Haverstock & Owens LLP

(57) ABSTRACT

A system for backing up data on a wireless telephone having a data store containing a user's personal information. A method and application are provided.

50 Claims, 13 Drawing Sheets

U.S. PATENT DOCUMENTS

| | | | |
|---|---|---|---|
| 6,732,264 B1 | 5/2004 | Sun et al. | 713/2 |
| 6,757,698 B2* | 6/2004 | McBride et al. | 707/204 |
| 6,781,575 B1* | 8/2004 | Hawkins et al. | 345/173 |
| 6,804,690 B1* | 10/2004 | Dysert et al. | 707/204 |
| 6,839,568 B2* | 1/2005 | Suzuki | 455/550.1 |
| 7,054,594 B2* | 5/2006 | Bloch et al. | 455/41.2 |
| 7,167,728 B1* | 1/2007 | Wagner et al. | 455/566 |
| 7,233,791 B2* | 6/2007 | Gilbert et al. | 455/419 |
| 7,269,433 B2* | 9/2007 | Vargas et al. | 455/502 |
| 2002/0010868 A1* | 1/2002 | Nakashima et al. | 713/201 |
| 2003/0134625 A1* | 7/2003 | Choi | 455/418 |
| 2004/0093385 A1* | 5/2004 | Yamagata | 709/206 |
| 2004/0192260 A1* | 9/2004 | Sugimoto et al. | 455/412.1 |
| 2004/0192282 A1* | 9/2004 | Vasudevan | 455/419 |
| 2004/0193953 A1* | 9/2004 | Callahan et al. | 714/15 |
| 2004/0235523 A1* | 11/2004 | Schrire et al. | 455/558 |
| 2005/0064859 A1* | 3/2005 | Kotzin et al. | 455/419 |
| 2005/0131990 A1* | 6/2005 | Jewell | 709/201 |
| 2007/0226272 A1 | 9/2007 | Huang et al. | 707/201 |

OTHER PUBLICATIONS

Chase, Larry, "Taking Transactions Online," Oct. 1998, pp. 124-132, Target Marketing, v. 21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS Are Sealed," Sep./Oct. 1993, pp. 46-51, Chief Information Officer Journal, v. 5 iss. 7.

* cited by examiner

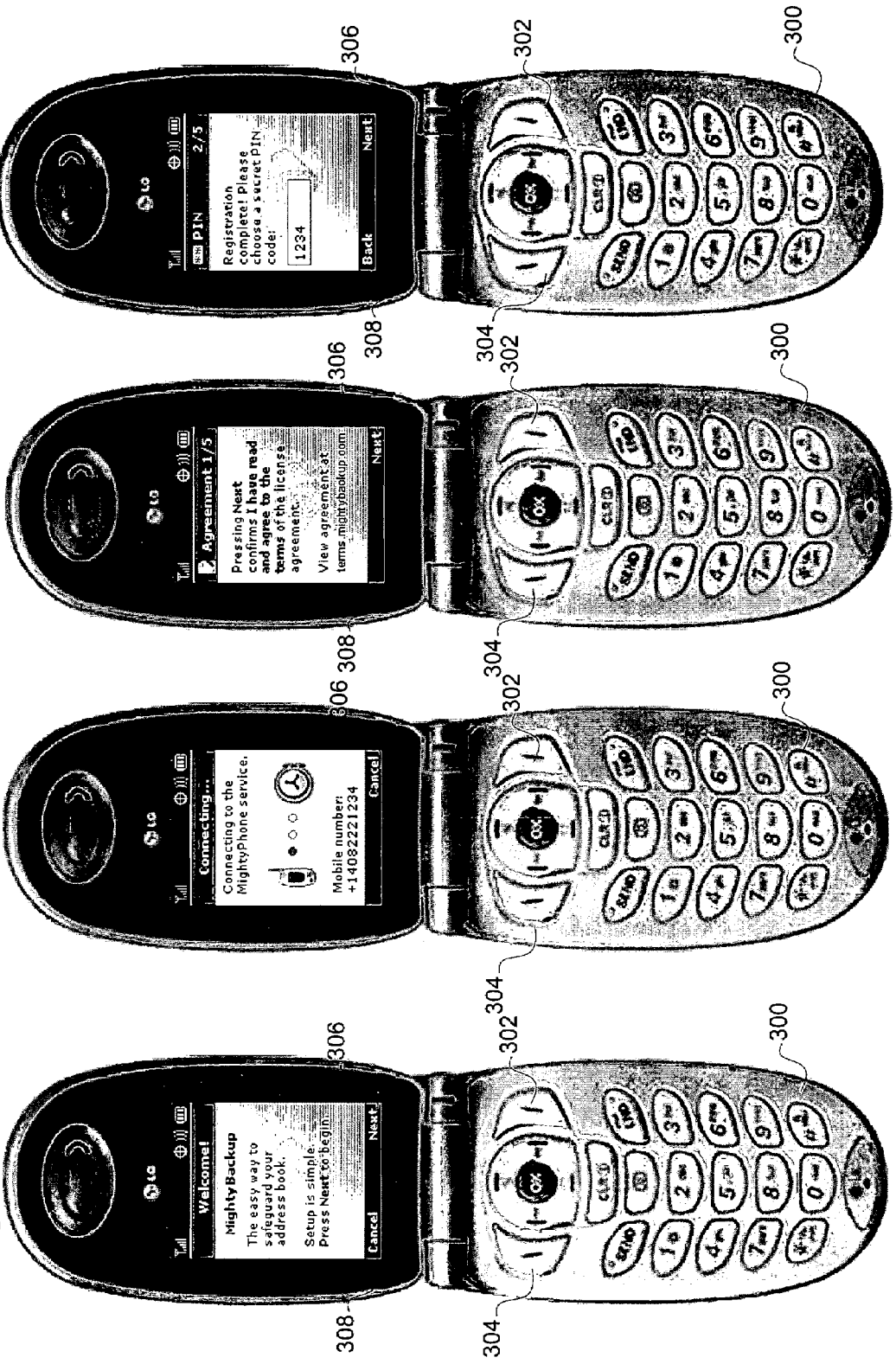

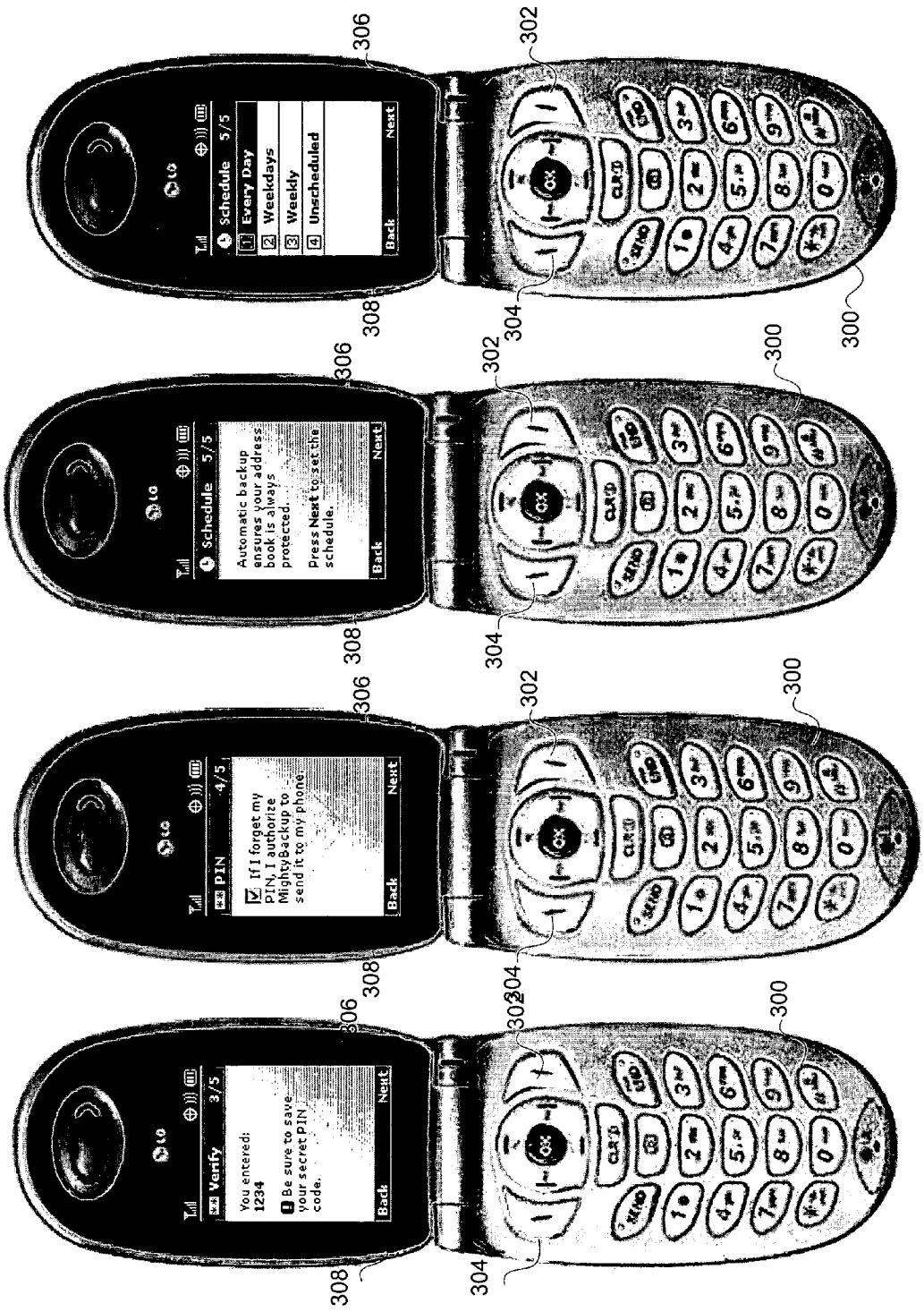

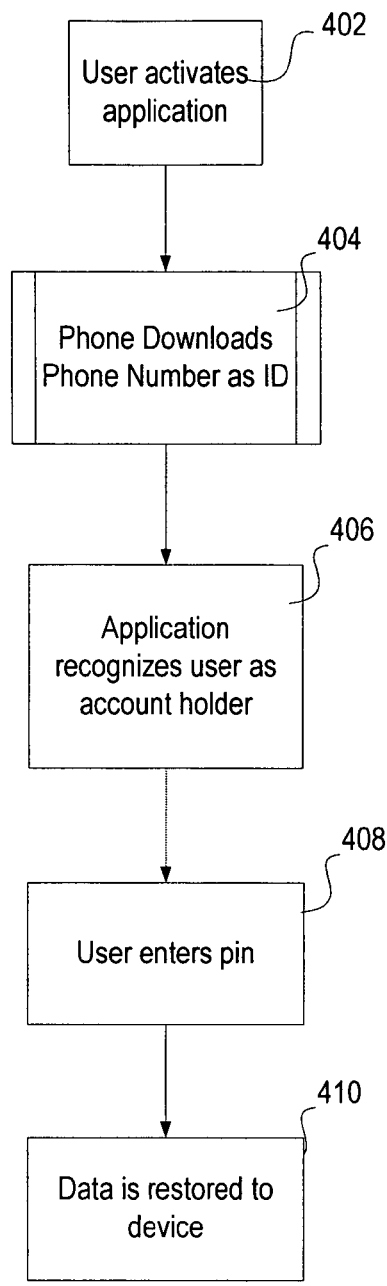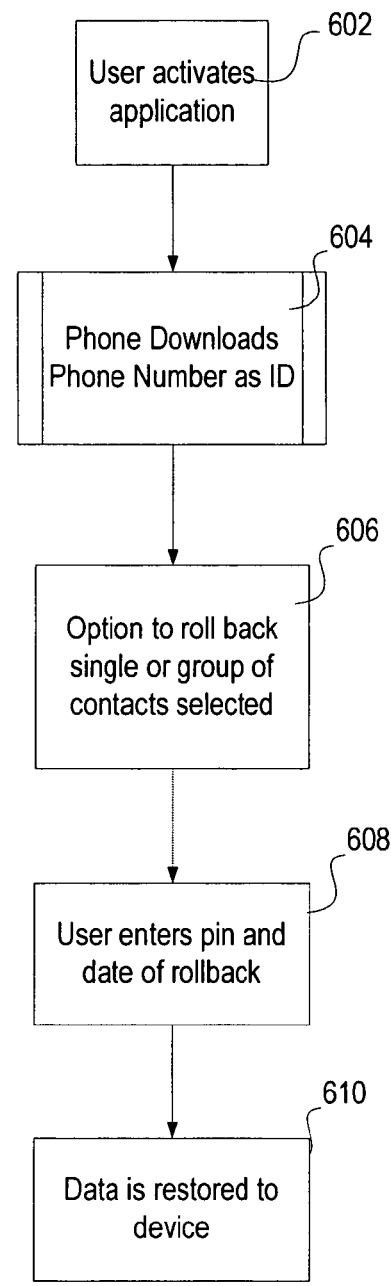
Figure 4
Figure 6

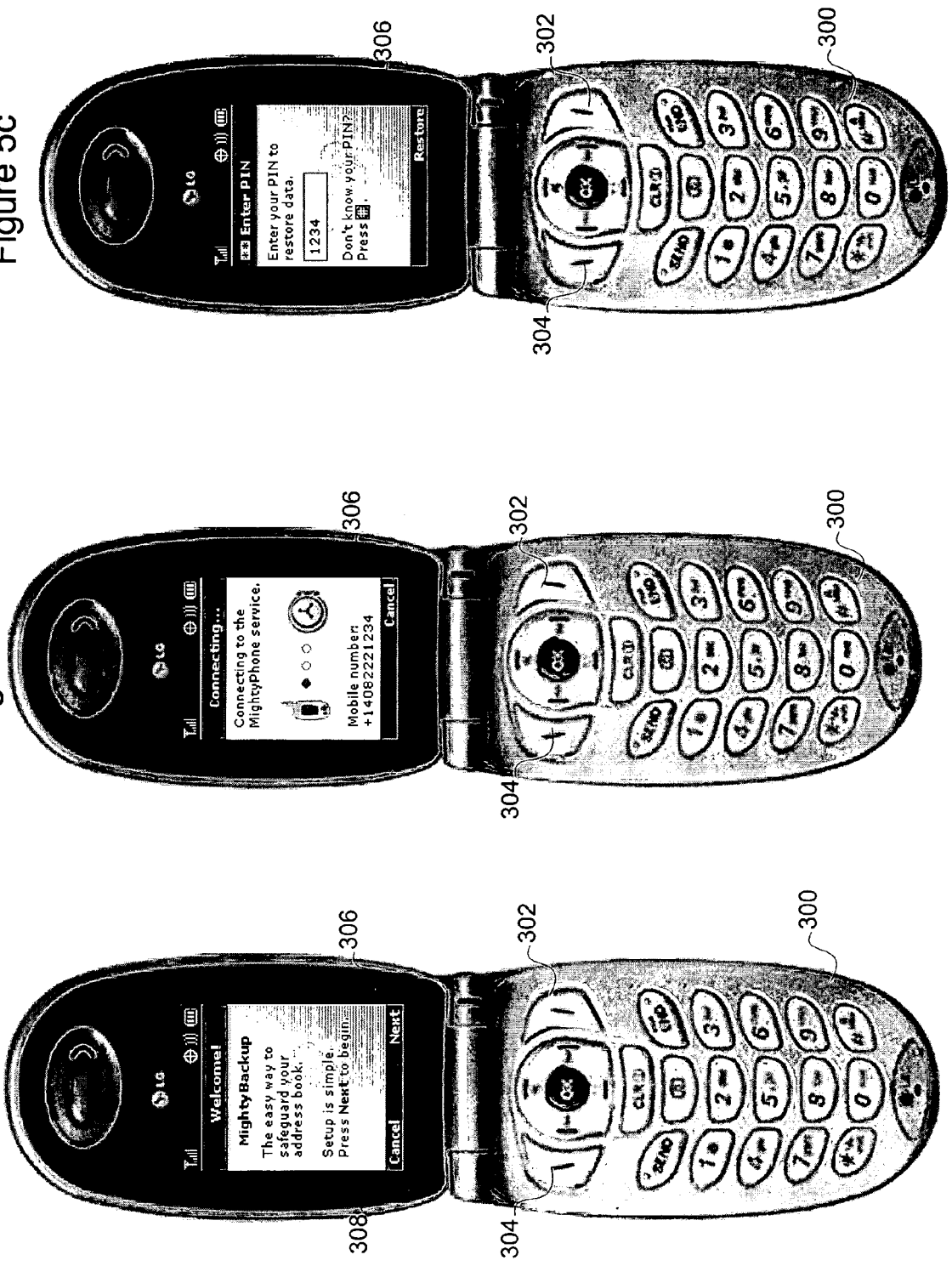

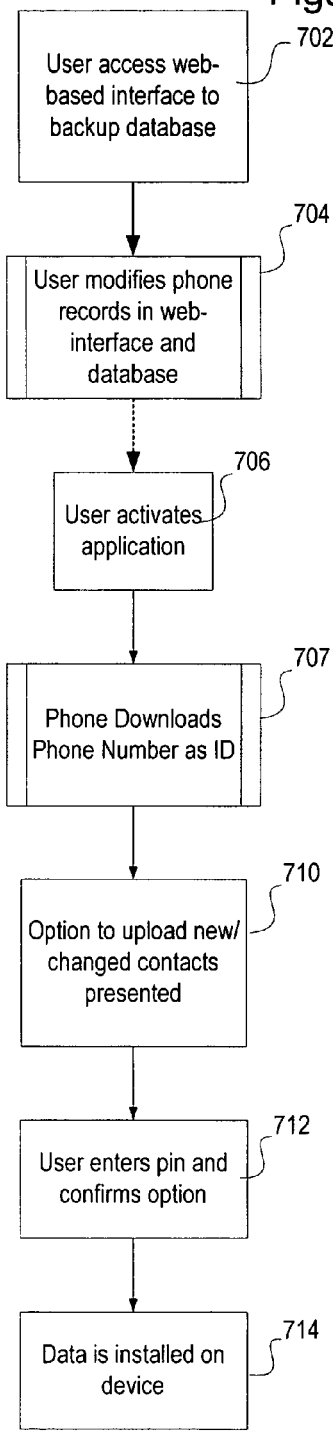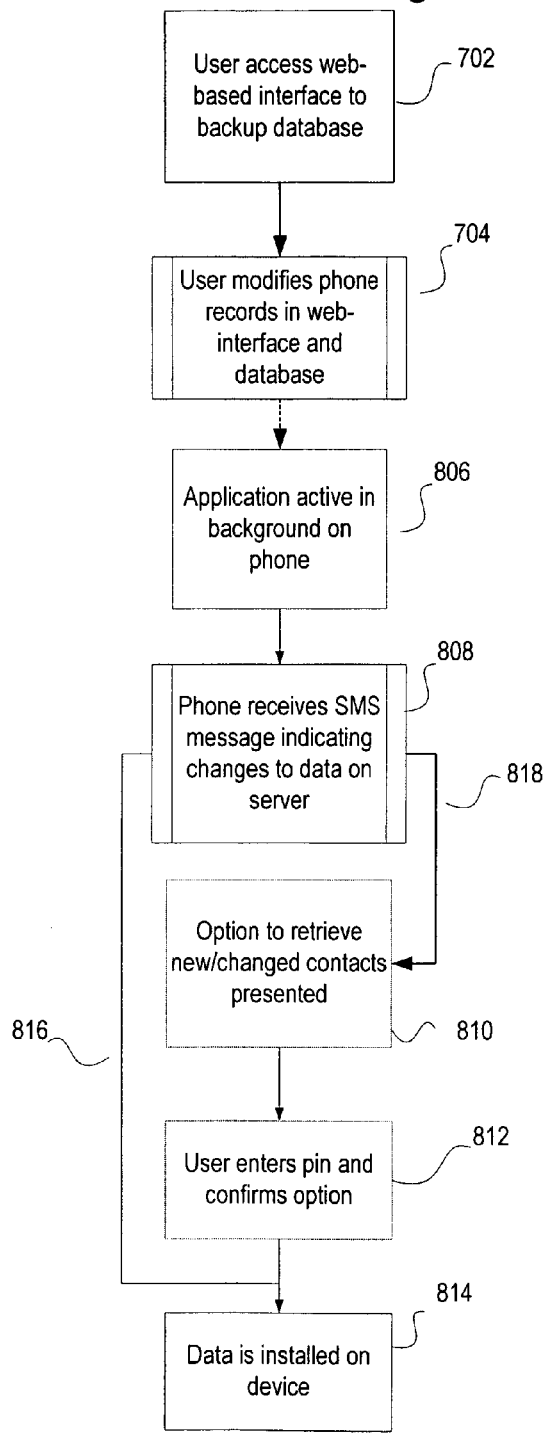

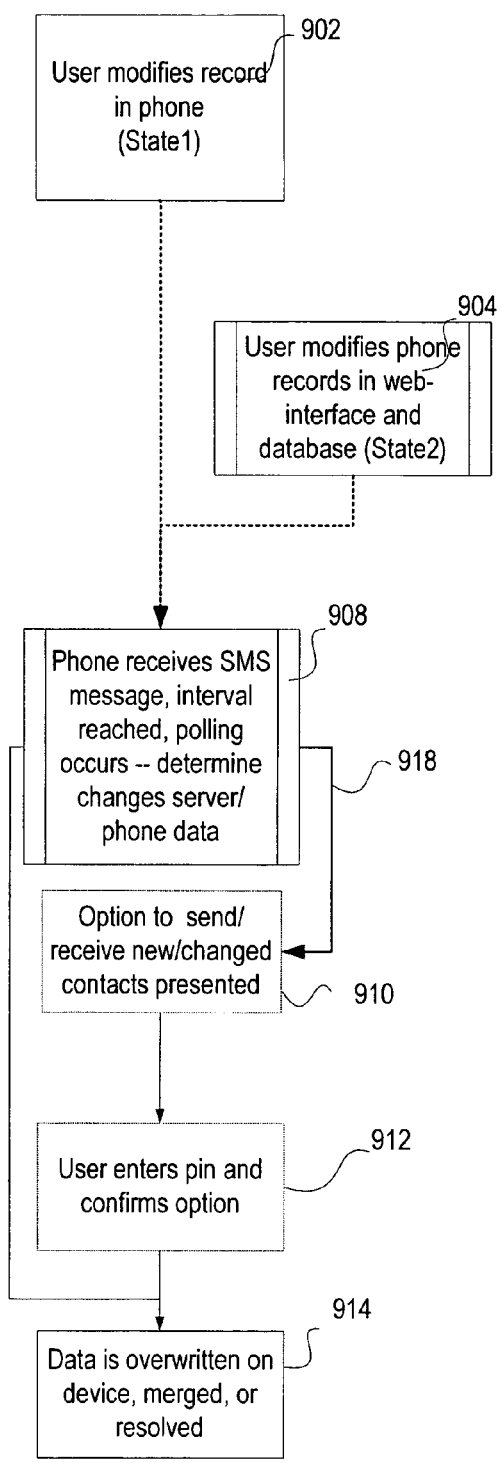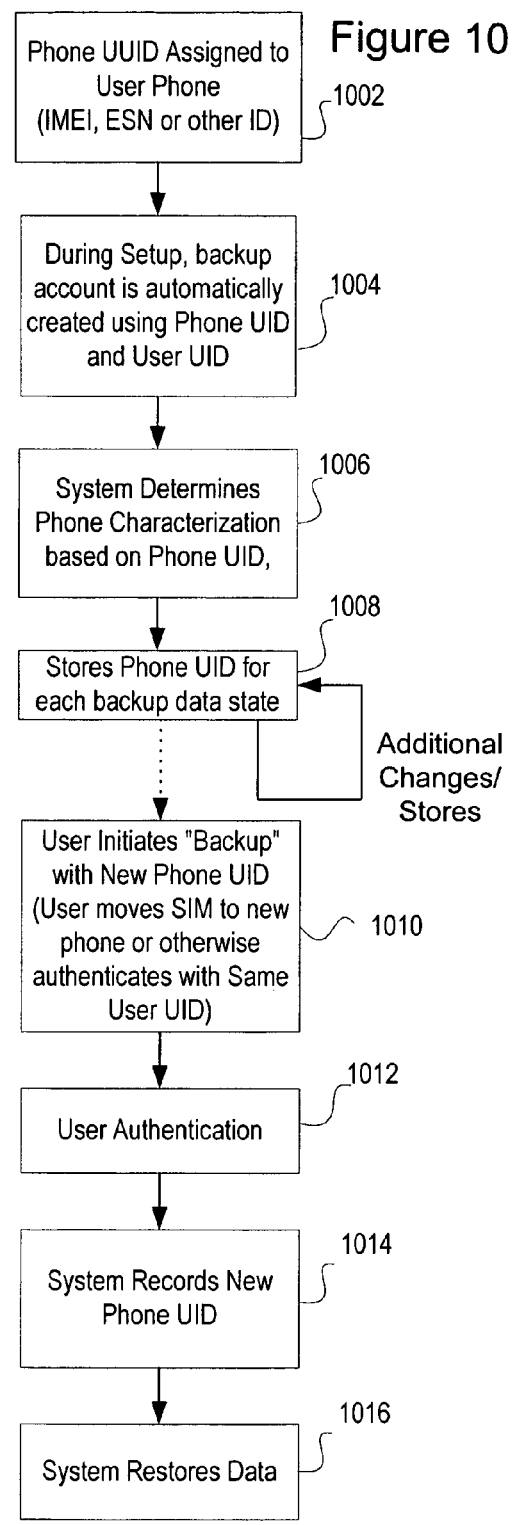

WIRELESS TELEPHONE DATA BACKUP SYSTEM

BACKGROUND OF THE INVENTION

1. Field of the Invention

The invention relates to the backup and restoration of data stored in a wireless telephone, and in particular a mobile telephone having data storage capabilities.

2. Description of the Related Art

Wireless communication devices, such as mobile telephones, have expanded beyond merely mechanisms for communication. Many telephones include features enabling personal productivity, games and even digital cameras. Devices which include personal productivity applications may include data storage for storing the owner's personal information within the storage devices. In addition, phones now have the ability to run application programs specifically designed for phone-based runtime environments.

All of an individual's personal information operated on and stored by a user can be considered within that user's "personal information space." In this context, a "personal information space" is a data store of information customized by, and on behalf of the user which contains both public data the user puts into their personal space, private events in the space, and other data objects such as text files or data files which belong to the user and are manipulated by the user. The personal information space is defined by the content which is specific to and controlled by an individual user, generally entered by or under the control of the individual user, and which includes "public" events and data, those generally known to others, and "private" events and data which are not intended to be shared with others. It should be recognized that each of the aforementioned criteria is not exclusive or required, but defines characteristics of the term "personal information space" as that term is used herein. In this context, such information includes electronic files such as databases, text files, word processing files, and other application specific files, as well as contact information in personal information managers, PDAs and cellular phones.

One difficulty users face is that it can be time consuming to enter information into a telephone, and once entered, the information is subject to loss. If the phone is damaged or simply lost by the user, and the time and effort spent to enter the information into the phone is lost. Some phones come with software and data connection cables allowing users to enter and backup information stored on a telephone by physically connecting the telephone to a personal computer. Many of these applications are provided by the manufacturer of the phone and are customized to interact directly with the phone. That is, the application program generally specifically designed for the telephone to retrieve data from the telephone and store it in the application on a personal computer. In addition, some third party vendors have attempted to make more universal synchronization systems that interact with phones through the physical cable.

The trouble with these physical connection mechanisms is that the user must consciously remember to physically connect the phone to the computer on a regular basis in order to ensure that the information backed up on the computer is accurate. In addition, the computer itself is subject to volatility. The data on the computer may be lost or damaged due to hardware and software failures.

While phone users generally desire increased functionality in phone based applications, they also desire the applications be relatively easy to use. Even general computer based utility applications, such as data back-up applications, are advantageous if they are set to run without significant user intervention. An application which would allow wireless phone users to quickly and easily backup their personal information stored on the telephone would be of great commercial and technical value.

SUMMARY OF THE INVENTION

The invention comprises a system for backing up data on a wireless telephone having a data store containing a user's personal information. A method and application are provided, and various aspects and variations of the system are described herein. The invention provides a convenient means for a user to ensure that information saved on a wireless phone, and the effort spent to ensure that information is entered and correct, are not lost if the phone itself is lost or damaged.

The invention, in one aspect, comprises a method for backing up personal information stored in a telephone. In this aspect, the method may include the steps of presenting a back-up system user account set-up interface on the phone; presenting a backup scheduling interface on the phone; and presenting a restore information interface on the phone.

In a further aspect, the method may include transmitting phone data to the backup system at user-defined intervals, or upon receipt of an indication from backup store that changes to data on the data store have occurred. The indicator may a result of polling the backup store to determine if changes have occurred.

The method may further include the step of providing an interface to the store via the web to alter data in the data store.

The method may include further providing a roll-back interface and an undelete interface.

In yet another aspect, the invention is a method for storing personal information in a wireless telephone in a backup storage database. In this aspect, the method may comprise the steps of: providing a phone agent including an automated phone data transmission method capable of regularly transmitting changes to a backup store via a communications link and a restore method; and responsive to said agent, providing changes from the backup store to the wireless telephone.

In a still further aspect, the invention is a method for maintaining personal information in a wireless telephone. In this aspect, the method includes the steps of establishing a user account, the user account identifying the user by an unique designation; and transmitting phone data to a backup store via a wireless network at regular intervals.

In another embodiment, the invention is an application for a wireless telephone. The invention includes an automated backup process transmitting changes to the backup system at user defined intervals. In addition, the application may include a restore process activated by a user to restore information stored on the backup system to the phone.

The application may include a rollback phone information process which returns data on the wireless to a state existing on a specified date. The application may further include an undelete record process. The application may include one or more processes running on a server, a BREW agent and/or a JAVA agent or an application designed to operate on a proprietary device or operating system (e.g., a Symbian operating system.)

In yet another embodiment, the invention is an application for storing personal information in a wireless telephone having a data store to a backup system. The application includes an automated user account creation method accessing the backup system using a unique identifier for the user to create a user account on the backup system; an automated backup method transmitting changes to the backup system at user defined intervals; and a restore method providing user data to a phone.

In another embodiment, the invention comprises one or more processor readable storage devices having processor readable code embodied on said processor readable storage devices, said processor readable code for programming one or more processors to perform a method comprising the steps of: presenting a backup scheduling interface; transmitting an initial set of phone data and changes to the phone data over time to a backup system; and presenting a restore information interface.

In a still further aspect, the invention is a backup system using a unique phone identifier in conjunction with personal information stored for a user. In a further aspect, the backup system associates a unique phone identifier with a unique user identifier. In a still further aspect, the phone identifier, the user identifier or both are universally unique. In a further aspect; the invention includes using an existing SyncML client on the phone as the backup client and auto creating the user account info on the server.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to various exemplary embodiments thereof. Other features and advantages of the invention will become apparent with reference to the specification and drawings in which:

FIG. 4 is a flow chart illustration a restore process utilized in accordance with the present invention.

FIGS. 5a through 5e illustrate user interface for conducting your restore process in accordance with the present invention.

FIG. 6 is a flow chart illustrating a rollback feature utilized in accordance with the present invention.

FIG. 7 is a flow chart illustrating user interaction with a web-based personal information manager to alter the data in the backup store and subsequently the information stored on the wireless telephone.

FIG. 8 is an alternative embodiment of the process shown in FIG. 7 illustrating user interaction with a web-based personal information manager which modifies user information stored on a wireless telephone.

FIG. 9 is a flow chart illustrating how two different states of data may occur and options for resolving those states.

FIG. 10 illustrates a method for implementing a backup system using a unique phone identifier associated with user data.

DETAILED DESCRIPTION

The present invention allows a user to wirelessly backup personal information stored on a cellular telephone using the wireless communication link, such as a wireless network, to which the phone can connect. The application results in a process which runs generally in the background of the user's phone application and therefore does not inhibit the user's use of the phone.

Figure 1:
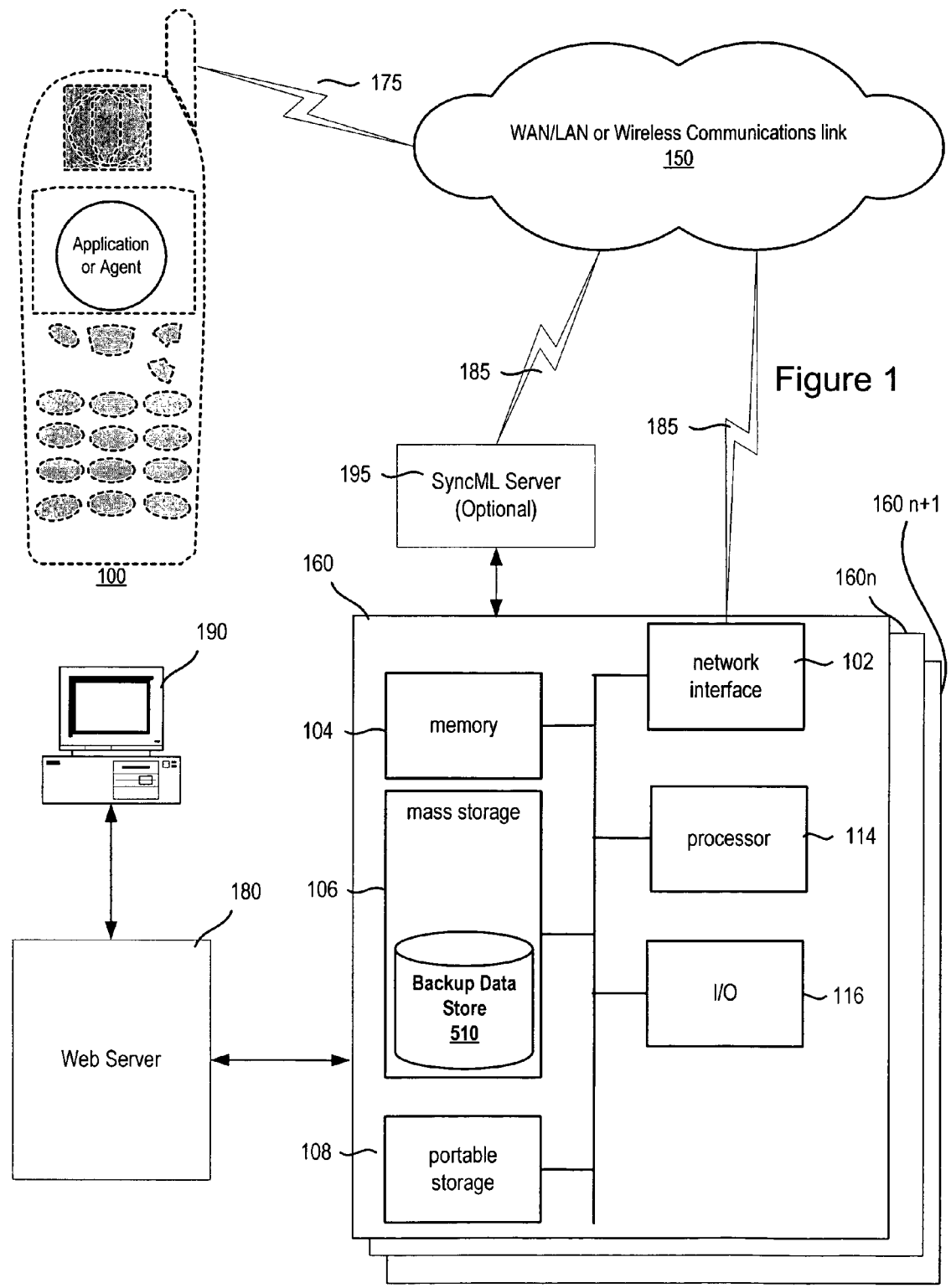
FIG. 1 is a block diagram illustrating the wireless telephone coupling to a backup server utilized in accordance with the present invention.

FIG. 1 illustrates a general overview of a system for implementing the present invention. As shown in FIG. 1, a wireless communication device, such as a phone 100, is connected to a wireless communications link, such as a cellular network 150, to transmit voice and data communications to other devices coupling to the wireless network. Data may be transmitted over the network in any number of known formats. A server 160 is also provided which communicates via a wireless link 185 with the telephone via wireless network 150. Alternatively, server 160 may communicate with phone 100 via a SyncML server 195. The backup system includes the agent 110, the backup store 150 on server 160, and methods implemented by the agent and server to perform the backup, restore and data integrity functions of the invention. Other components discussed herein may also be incorporated into the system in various embodiments.

Phone 100 is provided with a backup application or agent 110. Backup agent 110 can be a SyncML communication client designed to interact with a SyncML server 195 in accordance with approved and proposed versions of the SyncML OMA DS specification, including proposed extensions, (available at http://www.openmobilealliance.org). Alternatively, agent 110 can be an application designed to communicate with server 160 using an existing SyncML client on the phone provided by the phone's manufacturer (as well as any custom extensions supported by such client), or an application specifically designed to communicate with server 160 via another protocol, including a proprietary protocol. In one embodiment, the agent 110 is a fully implemented SyncML client and server 160 includes a SyncML server. In another embodiment, the application 110 is a client application device sync agent such as that disclosed in U.S. Pat. No. 6,671,757. In yet another embodiment, the application 110 is a client application responsive to control via a browser in the phone, with the application checking for changes to data on the phone and implements the processes described herein.

In general, a hardware structure suitable for implementing server 160, webserver 180 or SyncML server 195 includes a processor 114, memory 104, nonvolatile storage device 106, portable storage device 110, network interface 112 and I/O device(s) 116. The choice of processor is not critical as long as a suitable processor with sufficient speed is chosen. Memory 104 could be any conventional computer memory known in the art. Nonvolatile storage device 106 could include a hard drive, CDROM, CDRW, flash memory card, or any other nonvolatile storage device. Portable storage 108 could include a floppy disk drive or another portable storage device. The computing system may include one or more network interfaces 112. An example of a network interface includes a network card connected to an Ethernet or other type of LAN. I/O device(s) 114 can include one or more of the following: keyboard, mouse, monitor, display, printer, modem, etc. Software used to perform the methods of the present invention are likely to be stored in nonvolatile storage 106, portable storage media 110 and/or in memory 104. The computing system also includes a database 108, which can be stored in nonvolatile storage 106. In alternative embodiments, database 108 is stored in memory 104, portable storage 110 or another storage device that is part of the system of FIG. 1 or is in communication with the system of FIG. 1. Other alternative architectures can also be used that are different from that depicted in FIG. 1. Various embodiments, versions and modifications of systems of FIG. 1 can be used to implement a computing device that performs all or part of the present invention. Examples of suitable computing devices include a personal computer, computer workstation, mainframe computer, handheld computer, personal digital assistant, pager, cellular telephone, smart appliance or multiple computers, a storage area network, a server farm, or any other suitable computing device. There may be any number of servers 160n, n+1 managed by a system administrator providing a back up service in accordance with the present invention.

Also provided on server 160 is a backup data store 510. The backup data store is provided in the non-volatile memory space of server 160. While only one backup data store computer is shown, it should be recognized that the store may be replicated to or stored over a plurality of computers (160n, 160n+1) to ensure that the data thereon is protected from accidental loss. It should be understood that the representation of the SyncML server 195 and web sever 180 need not require that such servers be provided on different physical hardware than the backup server 160.

In accordance with the invention, application agent 110 communicates personal information and changes made to the personal information stored in the data store of the telephone 100 to server 160 via the wireless network. Communication of user data from the device may take several forms. Where the client is a SyncML client in communication with the server 160, communication may take place using the standards set forth in the SyncML specification. Changes are transmitted on a record-by-record basis or field-by-field basis. Alternatively, communication may occur via another protocol. In an alternative embodiment, agent 110 is a self-supporting application designed to run as a JAVA or BREW agent, or any other device or operating system specific agent (such as an agent operable on the Symbian Operating system). This agent can either include its own SyncML client, or interact with an existing SyncML client on the telephone. Changes can occur at field level or byte level. Alternative embodiments can communicate via alternative protocols via the wireless communications link to store information on the backup data base 510.

The server 160 stores user data in the backup store in a manner which associates the data with the user of the phone. In one embodiment the data is stored in bulk—that is all records and information for the user are stored in simple text form, or a copy of the entire database from the phone is stored on the server. In this embodiment, the server may store any number of copies of the data on a date-identified basis. Alternatively, the server 160 translates this information into change logs, in one embodiment, in accordance with the teachings of U.S. Pat. No. 6,671,757. This information is stored in backup data store 510 on server 160. This information is stored in the data store using a unique identifier (UID) associating the data with the individual user. The identifier may be any randomly selected identifier, so long as the user is uniquely identified, and the data is associated with the user. In a further aspect, this user UID may be a universally unique identifier (UUID), created in a manner described in the aforementioned U.S. Pat. No. 6,671,757 or other manners to create a single ID for a given user.

Data store 150 can be any form of data storage for the user data. In one embodiment, the data store is a simple copy of the information stored on the device 100. In another embodiment, the data store is a database, such as an object database or a relational database. In yet another embodiment, the data store is simply a storage container for change logs created in accordance with U.S. Pat. No. 6,671,757.

A web server 180 allowing a user on a computer or other device 190 having a web browser may optionally be provided to allow a user to configure aspects of the system of the invention. Server 180 may have a hardware configuration similar to computer 160 and may comprise one or more physical computers. Additionally, web server 180 may be integrated with server 160.

In general, a first embodiment of the system described below presents a system whereby certain aspects of the backup system of the present invention are configured via a phone interface. In each case where a phone interface is used, the system can alternatively be configured by a user via a web interface provided by the web server 180 via the user device 190.

Figure 2:
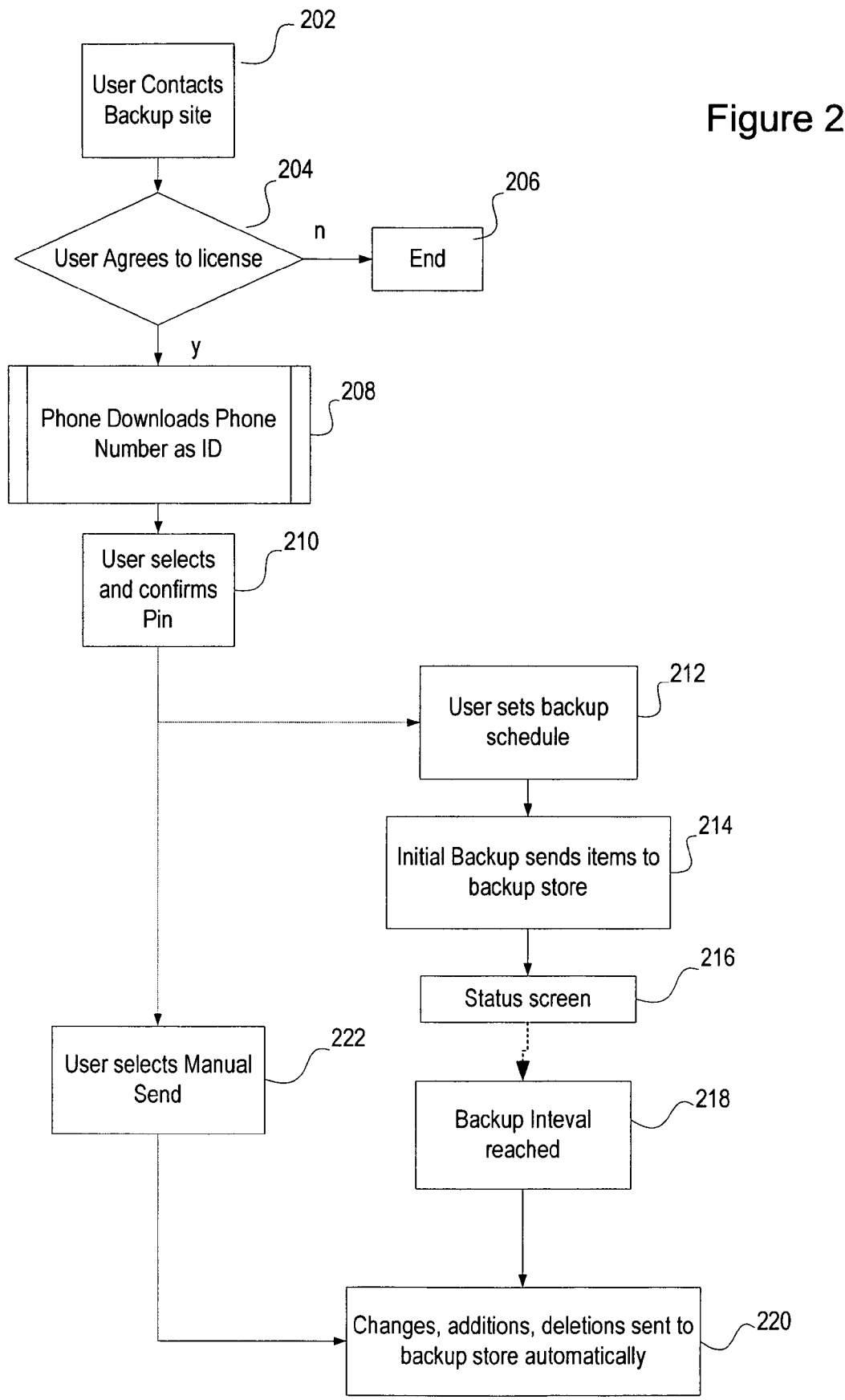
FIG. 2 is a flow chart illustrating how a user might sign up for and initially backup data using the system and the present invention.

FIG. 2 illustrates how a user interacting with the system on the present invention for the first time would install the application and sign up for the backup service provided by a system administrator using the backup server 160 and the user's phone 100. In the embodiment of FIG. 2, a user signs up for a backup service provided by a system administrator using the user's telephone and the application 110. An alternative sign-up process may be implemented by having the user initiate service by going to a World Wide Web site administered by the system administrator and interacting with or being provided by the system server 160. Still another method for sign up would be to allow the user to sign up via a specially formatted Wireless Application Protocol site which can be accessed by a WAP browser on the phone 100. (Another approach, discussed below with respect to FIGS. 10-12 involves the automatic creation of a user account using a phone unique identifier.)

The system administrator controls and maintains the server 160, and provides the agent 110 for the phone. Alternatively, the agent may be provided by a phone manufacturer and designed to communicate with server 160 (directly or thought SyncML server 195). The agent may be pre-loaded on the phone prior to distribution by the manufacturer or wireless service carrier, or provided for download by the administrator via the wireless network. In the latter embodiment, a user initially downloads the application from a system administrator via the communication link 185. In general, wireless carriers now provide many forms of downloadable applications for intelligent telephones having the ability to run the applications in a BREW or JAVA. BREW (Binary Runtime Environment for Wireless) is an open source application development platform for wireless devices equipped for code division multiple access (CDMA) technology. Likewise, JAVA or J2ME (Java 2 Micro Edition) are similar platforms from Sun Microsystems.

Figure 3L:
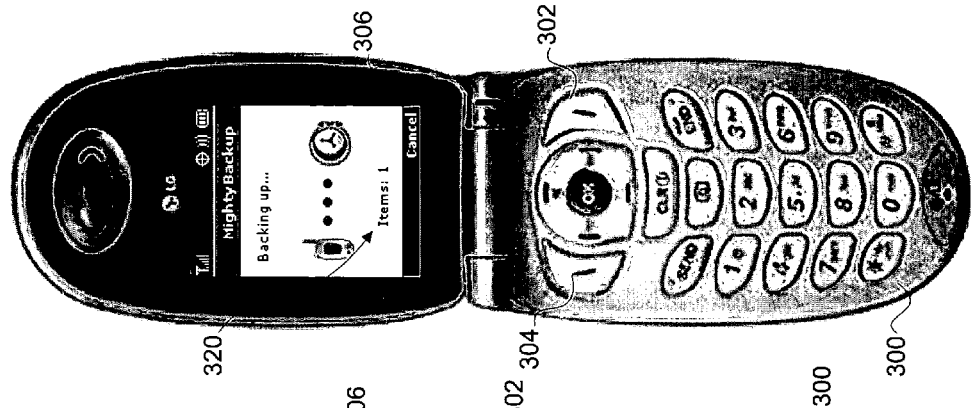
FIGS. 3a through 3q are screen shots illustrating how a user interface would allow a user to sign and initially backup data in the system of the present invention.

Once the application is installed, at step 202 in FIG. 2, the user contacts the backup site 160 using the phone 100 and application 110. The manner in which this might be presented to the user is illustrated in FIGS. 3a and 3b. A welcome screen is shown in FIG. 3a prompting the user select button 302 on wireless phone 300 to move to the "next" screen shown in FIG. 3b.

Figure 3K:
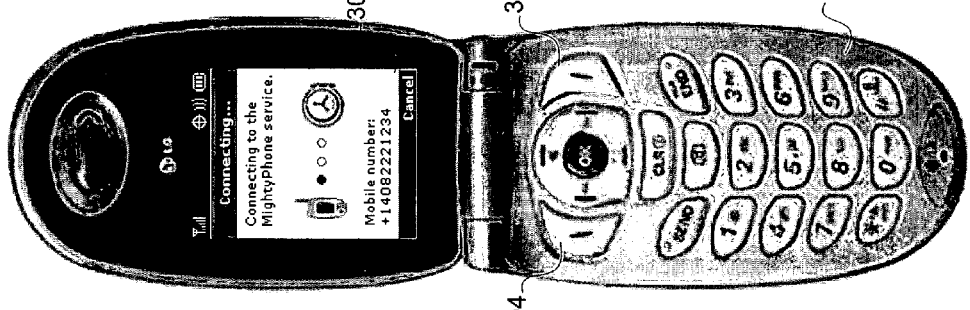
Figure 3J:
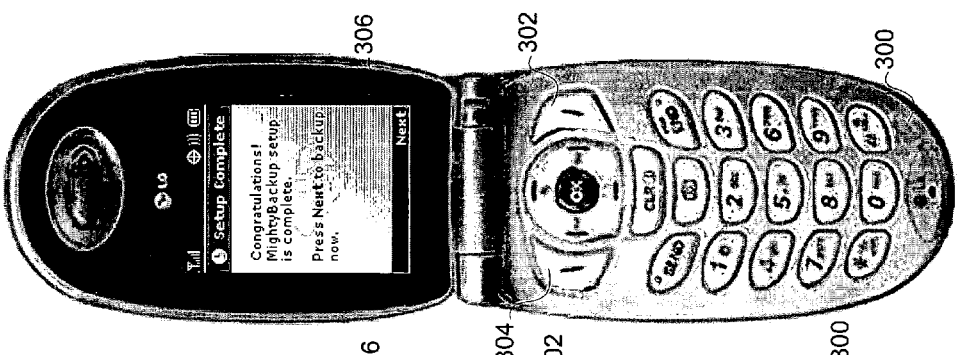
Figure 3I:
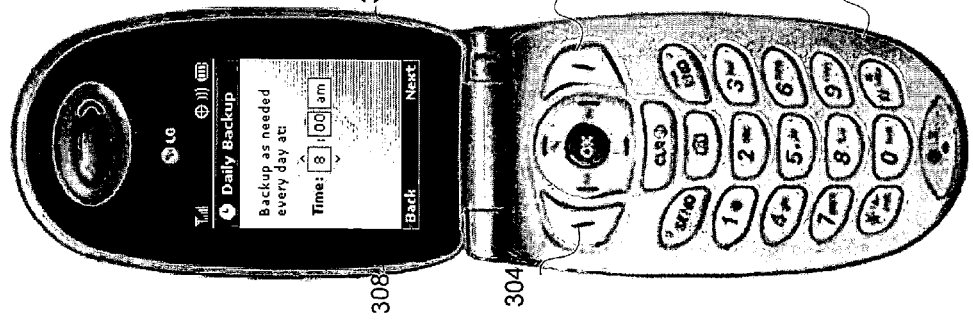
Figure 3M:
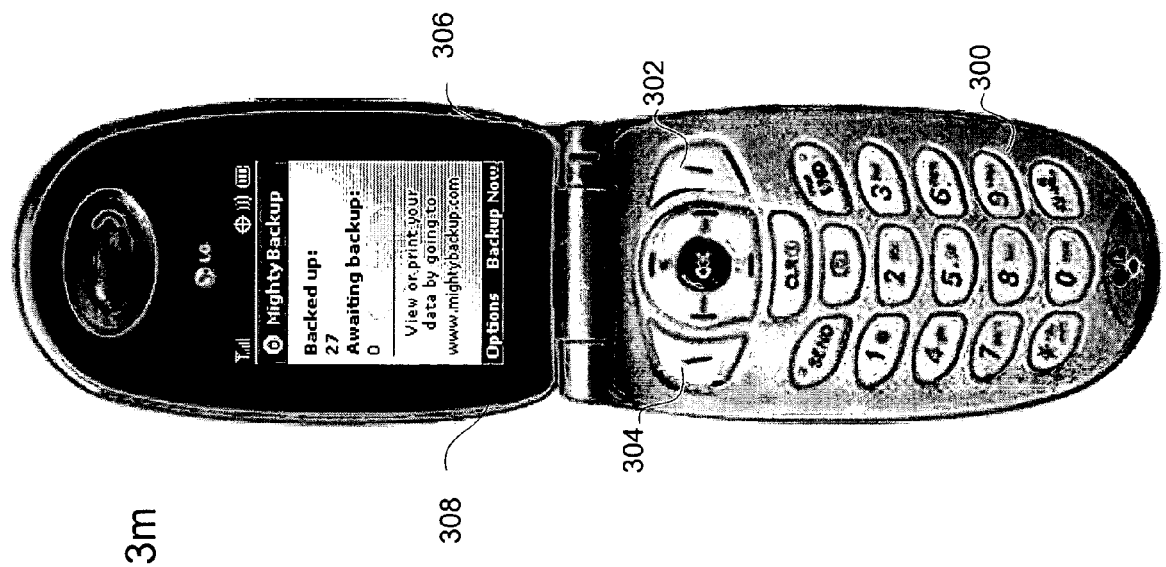
Figure 3Q:
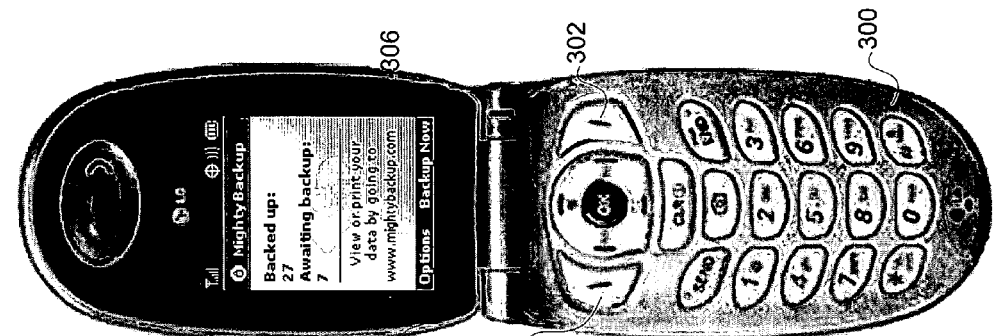
Figure 3P:
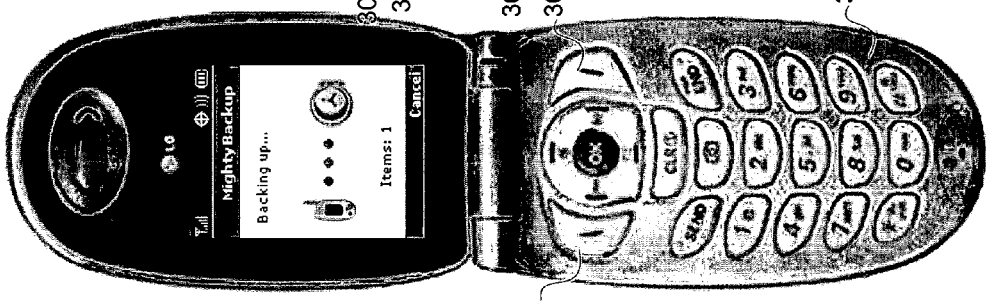
Figure 3O:
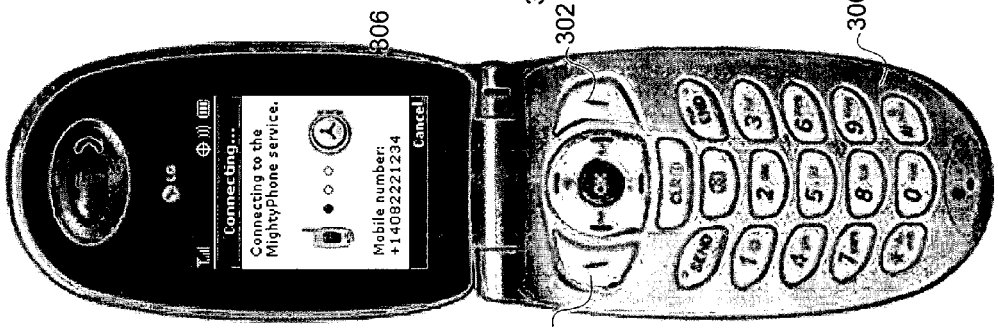

As will be understood by those of average skill in the art, a cellular telephone 300 shown in FIGS. 3a through 3q includes "soft" buttons 302 and 304. The menu items appearing at the lower portion of the screen indicated by reference numerals 306 and 308 are the commands which change relative to the display and are controlled by the application 110 (and other types) running on the cellular telephone 300. In FIG. 3a, a "next" button and a "cancel" button are shown. Buttons 302 and 304 control the "next" and "cancel" functions, respectively.

Once the user agrees to connect to the site, as shown in FIG. 3b, the user is presented with a screen illustrating the phone is connecting to the wireless network. The user's mobile number as shown at reference numeral 312 is displayed.

Returning to FIG. 2, at step 204, the user may be prompted to agree to a software license and license for using the service. This is illustrated in FIG. 3c. If the user does not agree at step 206, the process ends. If the user agrees, then at step 208, the phone downloads the user number as an ID. At step 210, the user selects and confirms a PIN. This is illustrated in FIGS. 3d through 3f. In FIG. 3d, the user enters a registration PIN into the phone and selects the next command by depressing soft button 302. In FIG. 3e, the phone displays the enter PIN and prompts the user to save the pin code. The user moves on to the next screen by depressing soft button 302. This screen in shown in FIG. 3f prompting the user to select an option for the service to return the PIN to the phone should the user forget the PIN.

Returning to FIG. 2, following completion of step 210 in FIG. 2, the user is prompted to set a backup schedule at step 212. This setup process is shown in FIGS. 3g through 3j. In FIG. 3g, the user is prompted to set the schedule by depressing the soft button 302. In FIG. 3h, four options are displayed for the user to select a regularly recurring schedule. These options are "every day", "week days", "weekly", or "unscheduled". When the user selects the next button in FIG. 3h, the daily backup screen is shown in FIG. 3i. The daily backup allows the user to set a specific time for the regularly scheduled backups. If the user selects a weekday schedule, this time can also occur at the same interval every day. The weekly schedules (selection 3 in FIG. 3) function in a similar manner. The "unscheduled" backup option allows the user to manually backup information on the phone by manually initiating the application and sending changes to the backup store as illustrated at step 222 in FIG. 2. In yet another embodiment, the scheduling can be to provide backup data to the server every time the user changes information on the phone.

In yet another embodiment, scheduling is at least partially controlled by the server 160. In this embodiment, when the user attempts to set a scheduling time, the server 160 checks a separately kept record of the backup transmission schedules of other users to ensure that load balancing of the transmissions of various users occurs on the server. If, for example, a user desires to send backup data every day at 8 AM, and a number of users desire the same time, the system can instruct the application 110 to alter its schedule in a manner which does not significantly impact the schedule for the user. This change can ensure that the server 160 has sufficient communications bandwidth and processing power to handle concurrent requests which may be occurring at or near the same scheduling time as the user's selected time.

In another embodiment, backup scheduling is controlled entirely by the server. In this aspect, the user is not provided with an interval selection, and the server can schedule interval backups (at regular, irregular or arbitrary times). In yet another embodiment, backup data is transmitted at some point after each change to the phone's data store.

Again returning to FIG. 2, once the backup scheduled has been set at step 212 in FIG. 2, the initial backup information must be stored on the server 160. This occurs at step 214 and is illustrated in FIGS. 3j through 3m. In FIG. 3j, once the setup is complete, the user is prompted to press the "next" soft button 302 to begin the initial backup process. Upon depressing the "next" soft button 302 as shown in FIG. 3k, the phone connects to the backup server 160, and at FIG. 3l the information is transmitted to the backup server. The items field 320 shown in the screen in FIG. 3l keeps a running count of the items being sent to backup server 160. When the backup is complete, FIG. 3m shows the status screen displayed by the phone upon completion of the backup process.

At this point, at the lower portion of the screen, soft buttons 302 and 304 present the user with a "backup now" option, allowing the user to manually send information to the phone as indicated at step 222 in FIG. 2, and a "options" button. The "options" button allows the user to select various administrative functions in accordance with the backup process. For example, the options might allow the user to change the schedule of the backup process, due to the user's mobile number account which is identified to the backup system 160, change the user PIN, access the help feature, or access information about the agent 110.

Figure 3N:
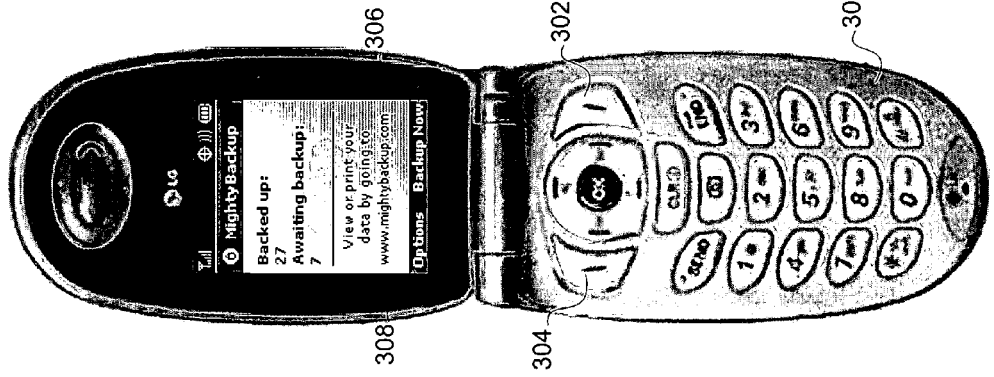

Returning to FIG. 2, once the status screen is shown in FIG. 216, the user may continue to use this telephone in the manner that the user is normally accustomed to. At a later point and time as indicated by the dashed interval between steps 216 and 218, the backup interval set by the user's schedule will be reached. At this point, changes and additions and deletions will be sent to the backup store. This is illustrated in FIGS. 3n through 3q. In FIG. 3n, the application may display a status screen to the user, in FIG. 3o display that it is connecting to the backup server 160, in FIG. 3p display the items being backed up, and in FIG. 3q display the status of the backup as completed. It should be recognized that the interval 218 may in fact comprise a manually initiated event as shown at step 222.

It should be further recognized that steps 218 and 220 may occur in the background, and no indication may be provided to the user. That is, once the backup interval is reached, the phone may simply download additions, deletions or changes to the user and keep a record of when it performed its last backup so the user can check to ensure that the backup process is running on a regular basis. The matter of interaction between the application and the user (e.g. how much information the application provides to the user about its activities) can be selected by the user. In an alternative embodiment, an indicator such as a "pop-up" information message may be provided to the user at competition of the backup. Users can select whether and how often to receive information messages.

Figure 5E:
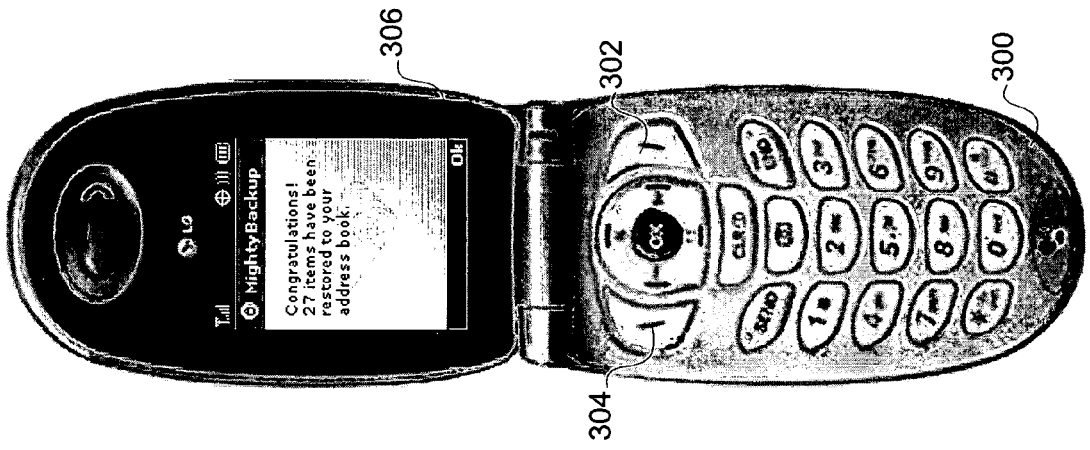

FIG. 4 shows a flow chart overview of the restore process utilized in accordance with this present invention. FIGS. 5a through 5e illustrate the steps which a user might view at a user interface during the restore process. At step 402, the user activates the application. This may occur, for example, when a user obtains a new telephone or the memory of the user's current telephone is wiped out for some unknown reason. Once the user activates the application, a status screen as shown in FIG. 5a is displayed.

Returning to FIG. 4, at step 404, the device agent transmits the user's unique identifier to the server. In step 406, the identifier is indicated as being the user's phone number and this identifies the user to the backup system. Alternatively, the method may prompt the user to indicate whether the user has previously set up an account with the system administrator and request the user's original identifier and PIN. As this is an initial use of the application on a phone containing no user data, in one embodiment, the server can recognize that no data is present in the phone and prompt the user to do a restore, the application will promptly recognize the user as an account holder at step 406. The application will then prompt the user to enter a PIN at step 420. This is illustrated in FIG. 5*c*.

Figure 5D:
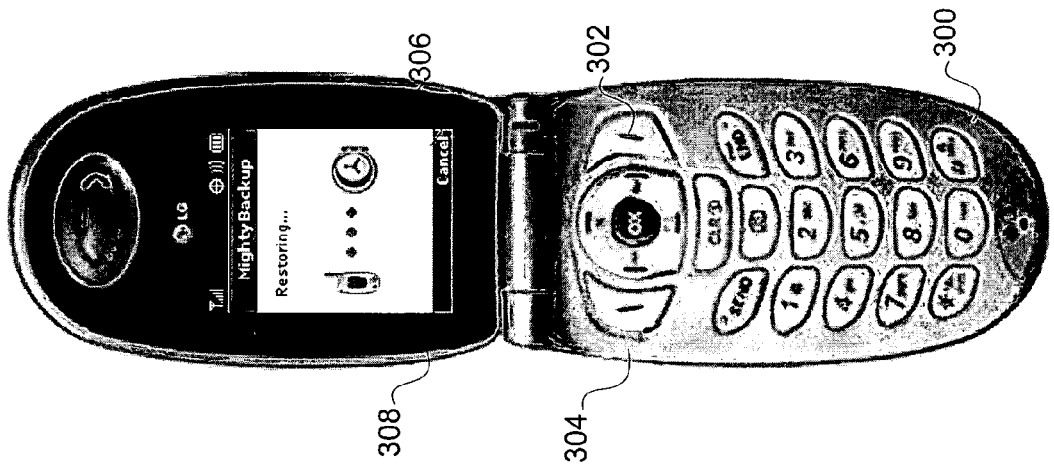

Once the user enters the PIN at step 408, data will be restored to the device in step 410. This is illustrated in FIG. 5*d* which indicates to the user that the application is "restoring" the information to the phone. FIG. 5*e* shows a status screen displaying to the user that the information has in fact been returned to the user's phone.

Alternative embodiments of the restore process may be utilized as well. In one alternative, the restore process may include providing information to a phone which has had information entered on it more recently than the backup store's state of the user's data. Suppose, for example, a user may has an account created with information in the backup store which creates a backup state, for example "state 1", at a given time. If the user needs to perform a restore—such as if the user looses a phone and purchases a new one—the restore process could simply provide the state 1 information to the device. If, however, the user manually enters information on to the device thereby creating a discordance between the state 1 information in the backup store and the more recently entered phone data.

In this discordance case, in one alternative, the state 1 information can be provided to the phone while ignoring any new information entered by the user on the phone (thereby making the backup store the primary information container and ignoring changes on the phone). In a second alternative, the agent can recognize that the phone is not equivalent to the phone used by the user to create the state 1 information (using for example a unique identifier for the phone, such as that discussed below, or some other means of identifying the new phone state—such as a user selection). Once the phone's state is established, the user's personal information stored in the phone is sent to the backup store, a process running on the server can resolve discrepancies or duplicates, and then write the new state of the user's data to the phone. In another alternative, the information on both the device and the backup store can be merged. In this latter alternative, a possibility of duplicate entries exists, and a mechanism for dealing with such duplicate entries (such as identifying them to the user and requesting which of the duplicates to keep) may be provided. Selection between such options may be given to the user during the setup process or under the options menu in the application or during restore, or on the web.

Additionally, the system can provide additional options allowing the user to roll back the user's personal data to a particular date and time. This functionality can be implemented in a number of ways, but is particularly suited to use in the system of the present invention as implemented using the backup technology disclosed in U.S. patent application Ser. Nos. 09/641,028, 09/642,615 and U.S. Pat. No. 6,671,757. The numerous advantages of the data backup technology in the U.S. Pat. No. 6,671,757 are discussed therein. However, it will be recognized that using such technology, one can re-create user data back to a particular date. Using such technology, the system starts with a first change-log or data package identified with a user and sequentially performs the actions defined therein on the data stored therein, searching for the change or date in question. When such change is reached, the item is "rolled back." In this embodiment, a bookkeeping log may be kept in order to remove future changes for this object from later change logs associated with the user, or one could note the state of the record in its rolled-back state and add a new "modify" change-log to the datastore using the pre-rollback "current version" as the base. Alternatively, this feature may also be implemented using any number of other technologies, such a technology which stores all changes associated with the user, and during restore function only returns the most recent changes or recent setup data to the user. Alternatively, the data store may store a complete set of data for each backup the user makes, though this often provides a relatively data intensive scheme.

This rollback option as illustrated in FIG. 6, once the use activates the application in step 602, the phone sends the unique identifier of the user (in one embodiment, the phone number) as the user identifier to the backup store 510 at step 660. At step 608, the application presents the user with an option to rollback a single or a group of contacts for a particular date. As step 608, once the user enters the PIN and the date of the rollback, and selects a single or group of contacts to be rolled back, the application restores the data from the storage server at step 610. Alternatively, the state of the data just prior to the performance of the rollback can itself be stored prior to the rollback function being performed. In a further embodiment, the agent can provide a "remember PIN" option, and store the PIN locally so the user does not need to re-enter the pin for each rollback or other identification function.

In alternative embodiments of the invention, a web-interface may allow access to the backup store and the user may implement the rollback function via the web interface. For example, the interface can display a list of dates of each sync and the number of records or fields synced, and allow the user to roll back an individual or collective dated group of contacts to their state on a particular date. This interface can also be implemented via a WAP specific interface for the phone 100.

FIG. 7 and FIG. 8 show yet another embodiment of the present invention when a user can optionally modify the data in the backup store using a separate interface. In one embodiment, the interface is a World Wide Web-based personal information manager which uses as its data source the backup store information or a mirror of such information which synchronizes to the backup store to modify the data in the backup store.

In FIG. 7, the user, at step 702 accesses a web-based interface to the backup information data in the backup database. At step 704, the user modifies records which are initially generated from the user's wireless phone 100 using the web interface and the changes are stored in the backup database. At some point in the future, as indicated by the dashed line between steps 704 and 706, the user (or scheduler, in automated or controlled scheduling embodiments) activates the application on the phone 100 and at step 708, the phone transmits the user identifier such as the phone number to the system. Once the system server 160 recognizes that the particular user is a member of the system, the option to upload new and changed contacts which have been changed by the web access at step 702 is presented to the user. After the user enters a personal information number at step 702, and confirms the upload process, data is installed on the device at step 712. Alternatively, the upload need not be confirmed, may be prompt-less, or optionally prompt the user. In another embodiment, changes to the data store 150 can be made by using any of a number of commercially available products which allow data access to a users software personal information manager application, such as that described in U.S. Pat. No. 6,671,757. Such products extract information from personal information managers such as Microsoft Outlook and transfer it to alternative formats which can be read by other applications.

FIG. 8 shows an alternative embodiment of the process in FIG. 7. Steps 702 and 704 occur as in the process illustrated in FIG. 7. In this embodiment, the application is active in the background on the phone and does not present the user with an option until the phone receives an SMS message at step 808 indicating to the application that changes to the data on the server have occurred. SMS (Short Message Service) is a service for sending messages of up to 160 characters (224 characters if using a 5-bit mode) to mobile phones. Following step 808, two optional processes may occur. At step 810, the user may be presented with an option to retrieve new and changed contacts from the server 160, and the information may be sent upon entry of the user's PIN at step 812 and confirmation of the upload process. When this occurs, data is installed in the device at step 814. Alternatively, as shown by line at 816, once the phone receives the SMS message indicating that changes to the data have occurred on the server, the agent will intercept the SMS message and retrieve changes made to the data store via the web interface automatically; the data may be installed on the device without any user intervention. Whether the application takes the manual route indicated by process line 818 or the automatic route indicated by process line 816 may be an option which user selects in a setup process which was not heretofore described in the setup of the application, or which is configured by the user administrator.

In a still further embodiment, the phone agent 100 may not wait for an SMS message but may simply periodically poll the server to determine whether changes have occurred to the backup store.

In yet another embodiment, the polling may determine whether changes have occurred on the phone relative to the backup data store, and transmit those changes to the data store. This embodiment is shown in FIG. 9. As shown therein, if a user modifies a record on the phone at step 902 and subsequently modifies a record on the backup store using the web interface at step 904, both before any changes on either the store or the phone are exchanged with the respective other device, the two states (state 1 and state 2) will be out of sync. At some time after the modifications at steps 902 and 904 as indicated by the dashed line between step 902, 904 and 908, with the application active in the background of the phone, some indication of the changes will occur. This is represented at step 908 and may occur when the phone receives an SMS message indicating changes have occurred, the polling of the server discussed above occurs, or the timed backup interval is reached. At this step 808, changes between the phone and the backup store are exchanged. As in FIG. 8, the data may be exchanged with user intervention (steps 910 and 912) or without (914). In addition, the conflict state discussed above with respect to the discordance case may occur, and the resolutions discussed above may likewise be implemented in this embodiment.

In a still further embodiment, the SMS message may instruct the phone to download any changes made to the phone since it's last backup transmission to the backup store.

A still further embodiment of the invention provides automation of the sign-up, account access and backup processes based on a unique phone identifier or phone UID which allows the system to determine more detailed functional information about the phone. In this embodiment, a phone UID may be associated with a user UID. In a further embodiment, the phone UID may be a universally unique phone ID (or phone UUID). In one embodiment, the phone UUID may comprise an IMEI or ESN. Each GSM phone contains an IMEI—International Mobile Equipment Identity number. This is a unique identifier assigned to all GSM devices. The IMEI is like a serial number and is used by the network to identify the handset (in conjunction with the SIM ID). The SIM ID is provided on a Subscriber Identity Module which is a small, stamp-size "smart card" used in a GSM phone. The SIM card contains a microchip that stores data that identifies the caller to the network service provider. The data is also used to encrypt voice and data transmissions, making it nearly impossible to listen in on calls. The SIM can also store phone book information—phone numbers and associated names.

CDMA phones also have an individual identification number, the ESN. This number can be found on the back of a handset under the battery and is usually eight digits long, combining letters and numbers.

The GSM Association (GSMA) has the role of the Global Decimal Administrator allocating International Mobile Equipment Identity Numbers (IMEI) to manufacturers for use in GSM. IMEI numbers are assigned to individual phones by the manufacturer and can identify the type, nature and characteristics of the phone to which they are assigned.

A method for using a phone UID associated with the user's data is shown at FIG. 10. In some point prior to the phones being distributed to a user at step 1002, a phone UID is assigned to a user's phone. The phone UID may comprise an IMEI or other ID such as an ESN number as discussed above. Subsequently, at step 1004, the user acquires the phone and depresses a "backup" option on the phone. The backup option may be provided in an application agent as discussed above, or in an application specifically tailored for use on the phone, also discussed above. Initiating the backup function on the phone in step 1004 will begin a backup process in accordance with any of the aforementioned embodiments, but will allow a backup account to be automatically created using a phone UID and a user UID. At step 806, using the phone UID, the system can determine the characterization (the type, features, and functionality) of the phone based on the phone UID. This is particularly true in cases of GSM phones using an IMEI number. It will be further recognized that in step 1004, the user UID can be the SIM ID which is provided by the SIM in a GSM phone. Alternatively, the user UID may be the phone number or any other unique identifier for the user.

At step 808, once both the phone UID and the user UID are known, a backup account can be automatically set up by the system without the need to know additional information from the user. Alternatively, additional authentication information may be required by the system, such as entry of a PIN.

At step 808, each time the user stores backup information to the backup data store, the phone UID specifying the phone from which the information is obtained can be recorded. Hence, the backup data store will know when the user uses an alternative phone having a different phone UID to store information.

At step 810, which may be separated in time from step 808 as indicated by the dash line between steps 808 and 810, the user initiates a backup data transmission using a new phone UID. This may occur, for example, when the user moves a SIM to a new phone in the GSM technology, or otherwise authenticates using his user UID any authentication required by the system. The authentication step 812 may be optional in cases where authentication is provided by the SIM ID or may be optionally disabled by the user.

Once the system's detects, at step 810, that the user has provided a new phone UID, at step 814, the system records the new phone UID at step 816 and the system can automatically perform the system data restore transmitting changes to the new phone. In the situation shown in steps 810 through 816, because the user has switched the phone UID, it will be known to the system that the most recent backup state came from a different phone and the new phone UID will have a data state which is not current.

Again, as in the discordance data state case discussed above, the user may enter data onto the new phone prior to performing initiation of the backup at step 810. In this case, the performance or data handling discussed above with respect to the discordance case can again be applied.

Figure 11:
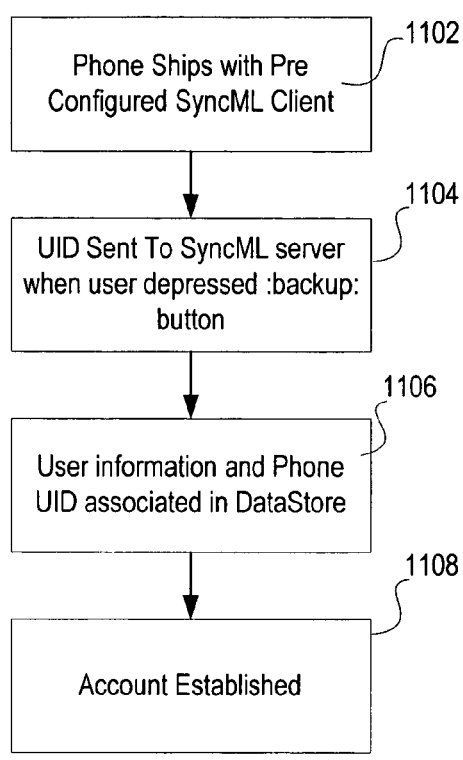
FIG. 11 illustrates a method for using a pre-provisioned manufacturer provided SyncML client on a phone to communicate with the backup server.
Figure 12:
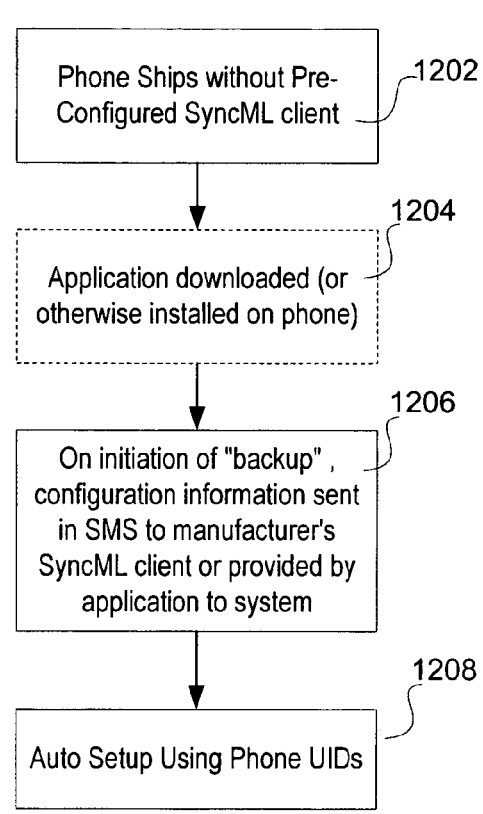
FIG. 12 illustrates a method for provisioning a manufacturer provided SyncML client on a phone to communicate with the backup server.
Figure 1:
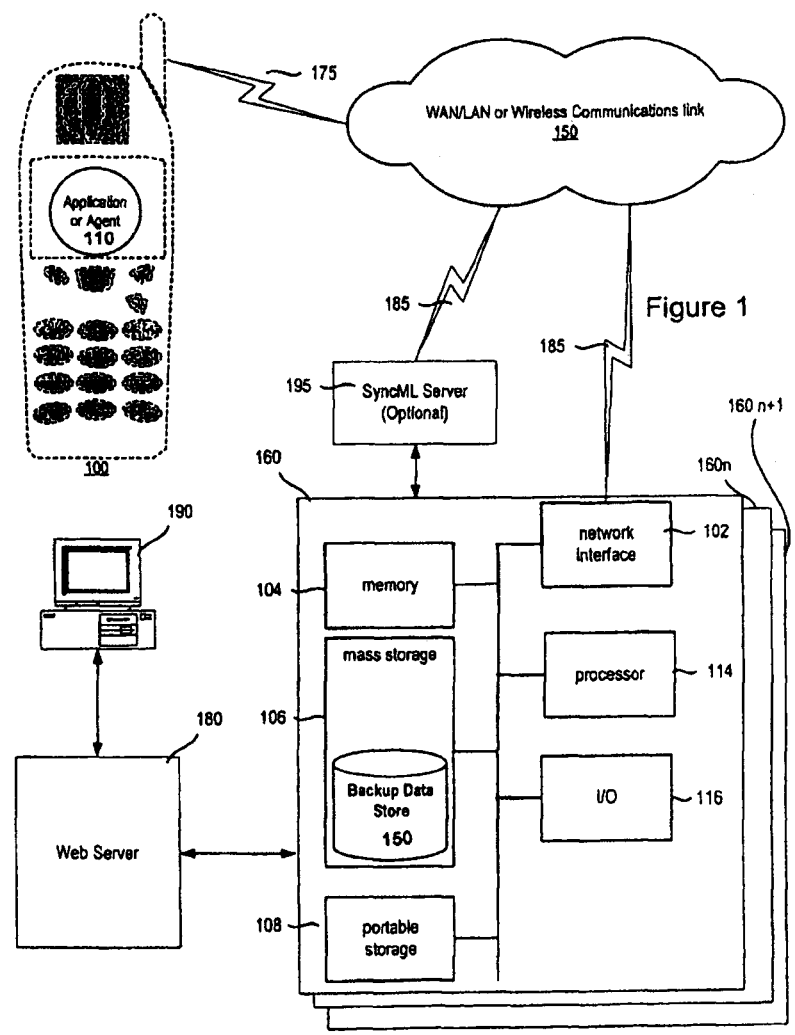

FIGS. 11 and 12 show two alternatives to the manner in which step 1004 is performed. In accordance with the present invention, any communication between the phone and the serve 160 holding the backup store may occur though any number of protocols. In one embodiment, SyncML is used and in such embodiment, the agent 110 may have an integrated SyncML client or the manufacturer's SyncML client normally provided in the phone may be used. FIGS. 11 and 12 show methods for using the manufacturer's SyncML client.

In FIG. 11, at step 1004, the phone is assumed to have shipped with a preconfigured SyncML client. By preconfigure, the SyncML client on the phone is shipped such that by depressing the backup (or sync) option in the agent, the phones' manufacturers sync agent has the identification information to access the SyncML server 495 shown in FIG. 1. At step 1102, where the phone ships with a preconfigured SyncML client, the phone UID and user UID are sent to the SyncML server when the user depresses the backup button on the phone. At step 1106, the user information and phone UID are associated in the backup data store, and an account is established at step 1108.

At FIG. 12, the phone ships without a preconfigured SyncML client at step 1202. This is at 1204, optionally, the agent may need to be downloaded and installed on the phone at step 1204. At step 1206, upon initiation of the backup option in the phone application, configuration information can be sent via an SMS message to the phone manufacturer's SyncML client providing configuration provisioning information to the SyncML client. This allows the SyncML client on the phone to address the SyncML server 195 in FIG. 1. Next, the account establishment process at step 1208 begins using the phone UID and user UID.

In the embodiment discussed with respects to FIGS. 10 through 12, user experience can be relatively unobtrusive. For example, the user need only press a "backup" soft button on the phone to have the account establish information transmitted to the backup data store. Any loss or change in the SIM to a different phone will result in the restore process being performed without any additional user intervention.

Additionally, the administrator of the backup data store can make determinations about how much data to provide to the phone. For example, if the phone is identified based upon the phone UID is known to be a feature rich device, the administrator can backup all settings which are available on the phones such as the calendar, task, and phone book. If, upon switching phone UID's, the user moves to a less feature rich phone, the provider can determine that, for example, the new phone has only an address book, and provide only the address book data in the restore function. The user need not provide any configuration information to the administrator during this process.

The foregoing detailed description of the invention has been presented for purposes of illustration and description. It is not intended to be exhaustive or to limit the invention to the precise form disclosed. Many modifications and variations are possible in light of the above teaching. For example, tasks performed by the agent on the phone may be performed by the server as the result of a call to a code on the server instructing the server to perform the method and return data to the server. In addition, where authentication is required by the system, the user may be provided with the option to store the authenticating information in the phone or agent and not manually enter the authentication each time required. Still further, authentication can be transmitted by means of exchanged SMS messages. The functions described herein may be assigned to the server or a phone agent or application based on the processing power available on the phone. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method implemented by a processing device on a wireless telephone for backing up personal information stored in the wireless telephone, comprising:

presenting a back-up system user account set-up interface on a user interface on the wireless phone, the set-up interface enabling establishment of a back-up service account, and the set-up interface including a display, one or more alphanumerical buttons and one or more soft buttons, different than the alphanumerical buttons, on the wireless phone, the function of the one or more soft buttons on the wireless phone changing, under control of a software application agent on the wireless phone, depending on the content displayed on the display screen;

presenting a backup scheduling interface to the user interface on the wireless phone, the backup scheduling interface accepting user input on a backup schedule, and the backup scheduling interface including a display, one or more alphanumerical buttons and one or more soft buttons, different than the alphanumerical buttons, on the wireless phone, the function of the one or more soft buttons on the wireless phone changing, under control of a software application agent on the wireless phone, depending on the content displayed on the display screen; and presenting a restore information interface on the user interface on the wireless phone, the restore interface enabling a user to retrieve backup information to a data store on the wireless phone, and the restore information interface including a display, one or more alphanumerical buttons and one or more soft buttons, different than the alphanumerical buttons, on the wireless phone, the function of the one or more soft buttons on the wireless phone changing, under control of a software application agent on the wireless phone, depending on the content displayed on the display screen.

2. The method of claim 1 wherein the user account setup interface calls a method allowing the user to set up a backup account with a backup store.

3. The method of claim 1 wherein the backup scheduling interface sets an interval to regularly send personal information to the backup store.

4. The method of claim 1 wherein the backup scheduling interface causes the transmission of personal information to the backup store upon modification of the information on the phone.

5. The method of claim 1 wherein the restore interface calls a method to upload all stored information on a backup data store to the data store on the phone.

6. The method of claim 5 wherein the method further includes providing a rollback interface to the user interface on the phone.

7. The method of claim 6 wherein the rollback interface is accessed via a web browser.

8. The method of claim 6 where the rollback interface is accessed via a wireless protocol.

9. The method of claim 6 wherein the rollback interface calls a method uploading changes based on a particular date.

10. The method of claim 1 wherein the method further includes providing an undelete interface.

11. The method of claim 10 wherein the undelete interface is accessed via a web browser.

12. The method of claim 10 wherein the undelete interface is accessed via a wireless protocol such as WAP.

13. The method of claim 10 wherein the undelete interface calls a method which transmits a change associated with a particular record in a user's personal information space.

14. The method of claim 1 wherein said personal information comprises an address book data store.

15. The method of claim 1 wherein said personal information comprises a task entry data store.

16. The method of claim 1 wherein said personal information comprises a calendar entry data store.

17. The method of claim 1 wherein said personal information comprises a note entry data store.

18. The method of claim 1 wherein said personal information comprises an alarm data store.

19. The method of claim 1 wherein said personal information comprises a custom dictionary data store.

20. A method for storing personal information in a wireless telephone in a backup storage database, comprising:
   providing a phone agent including instructions operable by a processor in the phone to implement an automated phone data transmission method capable of regularly transmitting changes to a backup store via a communications link, and a restore method retrieving backup information to a data store on the phone, the agent including a backup service sign-up interface, a backup method scheduling interface and a restore interface, calling the restore method, all provided to a user interface on the phone, the user interface on the phone including a display and one or more buttons on the phone; and
   responsive to user entry at the restore interface of said agent, providing changes from the backup store to the wireless telephone.

21. The method of claim 20 wherein the method further includes accepting personal information from the telephone at intervals defined by the user defined by the user via the backup method scheduling interface.

22. The method of claim 20 wherein the method further includes accepting user account set-up data from the service sign-up interface of the agent.

23. The method of claim 20 wherein the method further includes assigning a schedule of download intervals to the agent.

24. The method of claim 21 wherein the method further includes modifying the interval schedule to load balance amongst a plurality of users.

25. The method of claim 20 further including providing a notification to the agent that changes have been made to the backup store via a secondary interface.

26. The method of claim 25 wherein the phone agent updates the data store on phone upon receipt of a notification.

27. The method of claim 25 wherein the notification is a SMS message.

28. The method of claim 20 wherein the notification is a result of polling the server for changes.

29. The method of claim 25 wherein the method further includes providing the secondary interface and the secondary interface is a web interface.

30. A wireless telephone having a user interface for storing personal information and having a data store backup system, comprising:
   means for creating an automated user account initiated by a user via a user interface on a wireless telephone, the means for creating accessing the back up system using a unique identifier for the user to create a user account on the backup system;
   means for automatically backing up and transmitting changes to the backup system at user defined intervals; and
   means for restoring called by the user through a restore interface presented on the user interface of the phone, the means for restoring providing user data to a phone.

31. The wireless telephone of claim 30 wherein the application includes a rollback method providing a state of user data existing as of a specified date.

32. The wireless telephone of claim 30 wherein the application includes an undelete method providing at least one restored data item previously deleted by a user action.

33. The wireless telephone of claim 30 wherein at least the backup method and the account creation method are initiated by the agent.

34. The wireless telephone of claim 30 wherein the intervals are defined by user but altered by administrator.

35. The wireless telephone of claim 30 wherein the intervals are regular.

36. The wireless telephone of claim 30 wherein the intervals are arbitrary.

37. The wireless telephone of claim 30 wherein the restore method operates responsive to a phone recognized as having no data and an existing user account.

38. The wireless telephone of claim 30 wherein the account creation method is performed by the backup system via a secondary interface provided to the user.

39. A user interface implemented by a processing device on a telephone for backing up personal information stored in a telephone, comprising:
   an account set-up interface on the phone enabling establishment of a back-up service account;
   a scheduling interface on the phone allowing a user to manually set up a schedule for backing up data on the phone, the scheduling interface including:
   a display on the phone,
   alphanumeric buttons on the phone,
   soft buttons on the phone, different than the alphanumeric buttons, the function of the soft buttons changing depending on what is displayed on the display, and
   a software application agent on the phone for: 1) controlling what is displayed on the display, 2) controlling the function of the soft buttons, and 3) setting up a back-up schedule when information is sent to a back-up store based on information manually entered into the scheduling interface; and
   a restore information interface enabling a user to retrieve backup information to a data store on the phone.

40. The user interface of claim 39 wherein the backup scheduling interface causes the transmission of personal information to the backup store upon modification of the information on the phone.

41. The user interface of claim 39 wherein the restore interface calls a method to upload all stored information on a backup data store to the data store on the phone.

42. The user interface of claim 41 wherein the user interface further includes a rollback interface which returns data on the phone to a state existing on a specified date.

43. The user interface of claim 39 wherein said information comprises an address book data store.

44. The user interface of claim 39 wherein said information comprises a task entry data store.

45. The user interface of claim 39 wherein said information comprises a calendar entry data store.

46. The user interface of claim 39 wherein said information comprises a note entry data store.

47. The user interface of claim 39 wherein said information comprises an alarm data store.

48. The user interface of claim 39 wherein said personal information comprises a custom dictionary data store.

49. A user interface implemented by a processing device on a telephone for backing up personal information stored in a telephone, comprising:

- an account set-up interface on the phone allowing establishment of a back-up service account;
- a scheduling interface on the phone allowing a user to manually set up a schedule for backing up data on the phone;
- a restore information interface enabling a user to retrieve backup information to a data store on the phone, one or more of the account-setup interface, scheduling interface and the restore information interface including:
  - a display on the phone,
  - alphanumeric buttons on the phone,
  - soft buttons on the phone, different than the alphanumeric buttons, the function of the soft buttons changing depending on what is displayed on the display, and
  - a software application agent on the phone for: 1) controlling what is displayed on the display, and 2) variably setting the function of the soft buttons.

50. A user interface implemented by a processing device on a telephone for backing up personal information stored in a telephone, comprising:

- an account set-up interface on the phone enabling establishment of a back-up service account;
- a scheduling interface on the phone allowing a user to manually set up a schedule for backing up data on the phone; and
- a restore information interface enabling a user to retrieve backup information to a data store on the phone;
- one or more of the account-setup interface, scheduling interface and the restore information interface including a display on the phone, the display displaying one or more of words and icons, a user interacting with the user interface by selecting one or more of the words and icons on the display; and
- a software application agent on the phone for: 1) controlling what is displayed on the display, and 2) controlling backup of personal information based on the selection of one or more of the words and icons on the display.

* * * * *

UNITED STATES PATENT AND TRADEMARK OFFICE
CERTIFICATE OF CORRECTION

| | | |
|---|---|---|
| PATENT NO. | : 7,505,762 B2 | Page 1 of 5 |
| APPLICATION NO. | : 10/789816 | |
| DATED | : March 17, 2009 | |
| INVENTOR(S) | : Onyon et al. | |

It is certified that error appears in the above-identified patent and that said Letters Patent is hereby corrected as shown below:

The title page showing the illustrative figure should be deleted to be replaced with the attached title page.

In the drawing sheet, consisting of Fig. 1, should be deleted to be replaced with the drawing sheet, consisting of Fig. 1, as shown on the attached page.

At column 5, line 1, please replace "112" with "102" so that the corresponding sentence reads
- The computing system may include one or more network interfaces 102. -

At column 5, line 3, please replace "114" with "116" so that the corresponding sentence reads
- I/O device(s) 116 can include one or more of the following: keyboard, mouse, monitor, display, printer, modem, etc. -

At column 5, line 7, please replace "110" with "108" so that the corresponding sentence reads
- Software used to perform the methods of the present invention are likely to be stored in nonvolatile storage 106, portable storage media 108 and/or in memory 104. -

At column 6, line 18, please replace "computer" with "server" so that the corresponding sentence reads
- Server 180 may have a hardware configuration similar to server 160 and may comprise one or more physical computers. -

At column 6, line 49, please replace "thought" with "through" so that the corresponding sentence reads
- Alternatively, the agent may be provided by a phone manufacturer and designed to communicate with server 160 (directly or through SyncML server 195). -

At column 9, line 11, please replace "420" with "408" so that the corresponding sentence reads
- The application will then prompt the user to enter a PIN at step 408. -

Signed and Sealed this
Fourth Day of October, 2011

David J. Kappos
*Director of the United States Patent and Trademark Office*

CERTIFICATE OF CORRECTION (continued)
U.S. Pat. No. 7,505,762 B2

At column 10, line 19, please replace "510" with "150", and please replace "660" with "606" so that the corresponding sentence reads
- This rollback option as illustrated in Fig. 6, once the use activates the application in step 602, the phone sends the unique identifier of the user (in one embodiment, the phone number) as the user identifier to the backup store 150 at step 606. -

At column 11, line 32, please replace "100" with "110" so that the corresponding sentence reads
- In a still further embodiment, the phone agent 110 may not wait for an SMS message but may simply periodically poll the server to determine whether changes have occurred to the backup store. -

At column 12, line 38, please replace "806" with "1006 " so that the corresponding sentence reads
- At step 1006, using the phone UID, the system can determine the characterization (the type, features, and functionality) of the phone based on the phone UID. -

At column 12, line 46, please replace "808" with "1008" so that the corresponding sentence reads
- At step 1008, once both the phone UID and the user UID are known, a backup account can be automatically set up by the system without the need to know additional information from the user. -

At column 12, line 51, please replace "808" with "1008" so that the corresponding sentence reads
- At step 1008, each time the user stores backup information to the backup data store, the phone UID specifying the phone from which the information is obtained can be recorded. -

At column 12, line 57, please replace "810" with "1010", and please replace "808" with "1008", both replacements in two places, so that the corresponding sentence reads
- At step 1010, which may be separated in time from step 1008 as indicated by the dash line between steps 1008 and 1010, the user initiates a backup data transmission using a new phone UID. -

At column 12, line 63, please replace "812" with "1012" so that the corresponding sentence reads
- The authentication step 1012 may be optional in cases where authentication is provided by the SIM ID or may be optionally disabled by the user. -

At column 12, line 66, please replace "810" with "1010", please replace "814" with "1014", please replace "816" with "1016", and please replace "system's" with "system" so that the corresponding sentence reads
- Once the system detects, at step 1010, that the user has provided a new phone UID, at step 1014, the system records the new phone UID at step 1016 and the system can automatically perform the system data restore transmitting changes to the new phone. -

At column 13, line 3, please replace "810" with "1010", and please replace "816" with "1016", so that the corresponding sentence reads
- In the situation shown in steps "1010" through "1016", because the user has switched the phone UID, it will be known to the system that the most recent backup state came from a different phone and the new phone UID will have a data state which is not current. -

At column 13, line 10, please replace "810" with "1010" so that the corresponding sentence reads
- Again, as in the discordance data state case discussed above, the user may enter data on the new phone prior to performing initiation of the backup at step 1010. -

At column 13, line 27, please replace "495" with "195" so that the corresponding sentence reads
- By preconfigure, the SyncML client on the phone is shipped such that by depressing the backup (or sync) option in the agent, the phones' manufacturers sync agent has the identification information to access the SyncML server 195 shown in Fig 1. -

(12) United States Patent
Onyon et al.

(10) Patent No.: US 7,505,762 B2
(45) Date of Patent: Mar. 17, 2009

(54) WIRELESS TELEPHONE DATA BACKUP SYSTEM

(75) Inventors: Richard M. Onyon, San Jose, CA (US); Liam J. Stannard, San Jose, CA (US); Robert E. Garner, Lawrenceville, GA (US); Leighton A. Ridgard, San Jose, CA (US)

(73) Assignee: Fusionone, Inc., San Jose, CA (US)

( * ) Notice: Subject to any disclaimer, the term of this patent is extended or adjusted under 35 U.S.C. 154(b) by 558 days.

(21) Appl. No.: 10/789,816

(22) Filed: Feb. 27, 2004

(65) Prior Publication Data
US 2005/0191998 A1 Sep. 1, 2005

(51) Int. Cl.
*H04M 3/00* (2006.01)
(52) U.S. Cl. .................. 455/419; 455/418; 455/420; 455/466; 455/502; 707/204; 709/206; 709/248; 711/100
(58) Field of Classification Search ......... 455/412.1–2, 455/414.1–3, 418–420, 466, 558, 550.1, 455/566, 502; 379/93.17; 709/206; 704/260; 707/204, 201; 711/162, 100; 714/15; 345/169, 345/173
See application file for complete search history.

(56) References Cited

U.S. PATENT DOCUMENTS

| 5,933,653 | A |   | 8/1999  | Ofek ........................... 395/826 |
|-----------|---|---|---------|------------------------------------------|
| 5,974,238 | A | * | 10/1999 | Chase, Jr. ..................... 709/248 |
| 6,000,000 | A | * | 12/1999 | Hawkins et al. ................ 707/201  |
| 6,014,695 | A |   | 1/2000  | Yamashita et al. ............. 709/219   |
| 6,026,414 | A |   | 2/2000  | Anglin ........................ 707/204  |
| 6,038,665 | A | * | 3/2000  | Bolt et al. .................... 713/176 |
| 6,049,776 | A |   | 4/2000  | Donnelly et al. ............... 705/8    |
| 6,064,880 | A | * | 5/2000  | Alanara ....................... 455/419  |
| 6,173,311 | B1 |  | 1/2001  | Hassett et al. ................ 709/202  |
| 6,195,695 | B1 |  | 2/2001  | Cheston et al. ................ 709/221  |
| 6,219,694 | B1 | * | 4/2001 | Lazaridis et al. .............. 709/206  |
| 6,256,750 | B1 |  | 7/2001  | Takeda ........................ 714/11   |
| 6,260,124 | B1 | * | 7/2001 | Crockett et al. ............... 711/162  |
| 6,282,435 | B1 | * | 8/2001 | Wagner et al. ................. 455/566  |
| 6,285,889 | B1 | * | 9/2001 | Nykanen et al. ................ 455/557  |
| 6,292,905 | B1 |  | 9/2001  | Wallach et al. ................ 714/4    |
| 6,317,755 | B1 | * | 11/2001 | Rakers et al. ................ 707/204  |
| 6,360,330 | B1 |  | 3/2002  | Mutalik et al. ................ 714/4    |
| 6,363,249 | B1 | * | 3/2002 | Nordeman et al. .............. 455/418   |
| 6,381,700 | B1 |  | 4/2002  | Yoshida ....................... 713/201  |
| 6,396,482 | B1 | * | 5/2002 | Griffin et al. ................ 345/169  |
| 6,418,309 | B1 | * | 7/2002 | Moon et al. ................... 455/418  |
| 6,453,392 | B1 |  | 9/2002  | Flynn, Jr. .................... 711/151  |
| 6,539,494 | B1 |  | 3/2003  | Abramson et al. ............... 714/4    |
| 6,591,362 | B1 |  | 7/2003  | Li ............................ 713/1    |
| 6,704,849 | B2 |  | 3/2004  | Steegmans ..................... 711/162  |
| 6,728,530 | B1 | * | 4/2004 | Heinonen et al. ............... 455/414.1|

(Continued)

OTHER PUBLICATIONS

Finnigan, Anne, "The Safe Way to Shop Online," Sep. 1998, p. 162, Good Housekeeping, v. 227 No. 3.

(Continued)

*Primary Examiner*—Sharad Rampuria
(74) *Attorney, Agent, or Firm*—Haverstock & Owens LLP

(57) ABSTRACT

A system for backing up data on a wireless telephone having a data store containing a user's personal information. A method and application are provided.

50 Claims, 13 Drawing Sheets

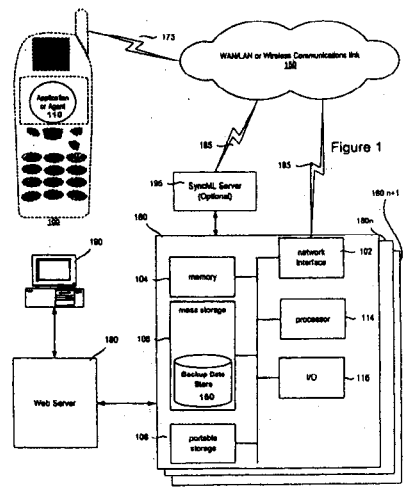

Figure 1

US007505762C1

(12) INTER PARTES REEXAMINATION CERTIFICATE (1125th)
United States Patent
Onyon et al.

(10) Number: US 7,505,762 C1
(45) Certificate Issued: Jun. 8, 2015

(54) WIRELESS TELEPHONE DATA BACKUP SYSTEM

(75) Inventors: Richard M. Onyon, San Jose, CA (US); Liam J. Stannard, San Jose, CA (US); Robert E. Garner, Lawrenceville, GA (US); Leighton A. Ridgard, San Jose, CA (US)

(73) Assignee: SYNCHRONOSS TECHNOLOGIES, INC., Bridgewater, NJ (US)

Reexamination Request:
No. 95/002,340, Sep. 14, 2012

Reexamination Certificate for:
Patent No.: 7,505,762
Issued: Mar. 17, 2009
Appl. No.: 10/789,816
Filed: Feb. 27, 2004

Certificate of Correction issued Oct. 4, 2011

(51) Int. Cl.
*H04M 3/00* (2006.01)
*H04W 8/20* (2009.01)
*H04M 1/2745* (2006.01)
*H04M 1/725* (2006.01)

(52) U.S. Cl.
CPC ........ *H04W 8/205* (2013.01); *Y10S 707/99953* (2013.01); *H04M 1/274516* (2013.01); *Y10S 707/99955* (2013.01); *H04M 1/72522* (2013.01)

(58) Field of Classification Search
None
See application file for complete search history.

(56) References Cited

To view the complete listing of prior art documents cited during the proceeding for Reexamination Control Number 95/002,340, please refer to the USPTO's public Patent Application Information Retrieval (PAIR) system under the Display References tab.

*Primary Examiner* — Luke S Wassum

(57) ABSTRACT

A system for backing up data on a wireless telephone having a data store containing a user's personal information. A method and application are provided.

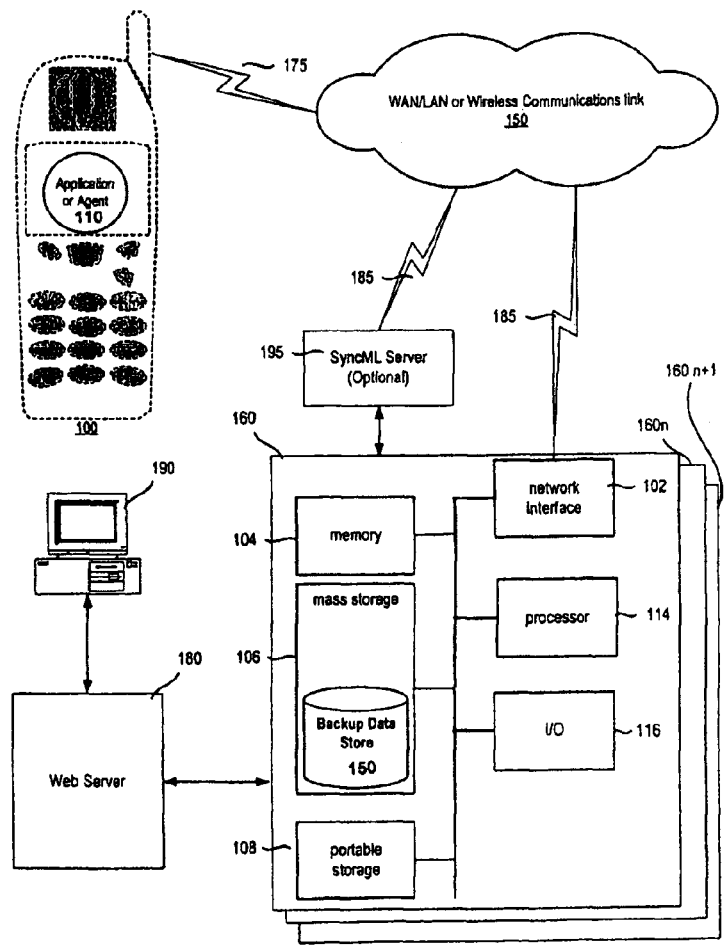

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 20 and 22 are cancelled.

New claims 51 and 52 are added and determined to be patentable.

Claims 1-19, 21 and 23-50 were not reexamined.

*51. A method for storing personal information in a wireless telephone in a backup storage database, comprising:*
*providing a phone agent including instructions operable by a processor in the phone to implement an automated phone data transmission method capable of regularly transmitting changes to a backup store via a communications link, and a restore method retrieving backup information to a data store on the phone, the agent including a backup service sign-up interface, a backup method scheduling interface and a restore interface, calling the restore method, all provided to a user interface on the phone, the user interface on the phone including a display and one or more buttons on the phone; and*
*responsive to user entry at the restore interface of said agent, providing only changes from the backup store to the wireless telephone.*

*52. A method for storing personal information in a wireless telephone in a backup storage database, comprising:*
*providing a phone agent including instructions operable by a processor in the phone to implement an automated phone data transmission method capable of regularly transmitting changes to a backup store via a communications link, and a restore method retrieving backup information to a data store on the phone, the agent including a backup service sign-up interface, a backup method scheduling interface and a restore interface, calling the restore method, all provided to a user interface on the phone, the user interface on the phone including a display and one or more buttons on the phone; and*
*responsive to user entry at the restore interface of said agent, providing at least one change log from the backup store to the wireless telephone.*

\* \* \* \* \*